US012705172B2

(12) United States Patent
Lee et al.

(10) Patent No.: US 12,705,172 B2
(45) Date of Patent: Aug. 11, 2026

(54) MEMORY CONTROLLER FOR PERFORMING READ OPERATION AND OPERATING METHOD THEREOF

(71) Applicant: SK hynix Inc., Icheon-si (KR)

(72) Inventors: Jeong Myung Lee, Icheon-si (KR); Young Jin Baek, Icheon-si (KR); Hong Sik Yun, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 16 days.

(21) Appl. No.: 19/036,903

(22) Filed: Jan. 24, 2025

(65) Prior Publication Data

US 2026/0050548 A1 Feb. 19, 2026

(30) Foreign Application Priority Data

Aug. 13, 2024 (KR) ........................ 10-2024-0108347

(51) Int. Cl.
*G06F 12/02* (2006.01)

(52) U.S. Cl.
CPC ...... *G06F 12/0246* (2013.01); *G06F 12/0238* (2013.01); *G06F 12/0261* (2013.01)

(58) Field of Classification Search
CPC ............. G06F 12/0246; G06F 12/0238; G06F 12/0261
USPC .................................................. 711/103, 102
See application file for complete search history.

(56) References Cited

U.S. PATENT DOCUMENTS

2016/0132256 A1* 5/2016 Jung .................. G06F 12/0246 711/103
2021/0287751 A1* 9/2021 Oh ...................... G11C 29/028
2025/0147877 A1* 5/2025 Tang .................. G06F 12/0246

FOREIGN PATENT DOCUMENTS

KR 10-2021-0024912 A 3/2021

* cited by examiner

*Primary Examiner* — Hosain T Alam
*Assistant Examiner* — Zubair Ahmed

(57) ABSTRACT

A memory controller includes a history voltage storage unit configured to store information on a plurality of history average voltages each representing an average voltages of each of a plurality of threshold voltage distributions for the plurality of memory cells, and a read voltage setting unit configured to, when a read operation performed by using a read voltage fails, determine a first cell count representing a number of cells measured based on the read voltage, determine a second cell count representing a number of cells predicted based on the read voltage through a first arithmetic operation performed based on an average voltage that is adjacent to the read voltage and selected from among the plurality of history average voltages, and adjust a level of the average voltage through a second arithmetic operation performed based on a difference between the first and second cell count.

20 Claims, 13 Drawing Sheets

MSB1 CSB1 LSB1 CSB2 MSB2 CSB3 LSB2

| | $\mu_{erase}$ | $\mu_{PV1}$ | $\mu_{PV2}$ | $\mu_{PV3}$ | $\mu_{PV4}$ | $\mu_{PV5}$ | $\mu_{PV6}$ | $\mu_{PV7}$ |
|---|---|---|---|---|---|---|---|---|
| LSB | 1 | 1 | 1 | 0 | 0 | 0 | 0 | 1 |
| CSB | 1 | 1 | 0 | 0 | 1 | 1 | 0 | 0 |
| MSB | 1 | 0 | 0 | 0 | 0 | 1 | 1 | 1 |
| SEL_RD_DATA | 111 | 110 | 100 | 000 | 010 | 011 | 001 | 101 |

FIG. 6

LSB1 ASSL LSB2

| | | | | |
|---|---|---|---|---|
| | $\mu_{erase}$ $\mu_{PV1}$ $\mu_{PV2}$ | $\mu_{PV3}$ $\mu_{PV4}$ | $\mu_{PV5}$ $\mu_{PV6}$ | $\mu_{PV7}$ |
| SEL_CNTL<1:2> | 1 | 0 | 0 | 1 |
| ASS_CNTL | 1 | 1 | 0 | 0 |
| FIRST_CNTL<1:2> | 11 | 01 | 00 | 10 |

FIG. 7

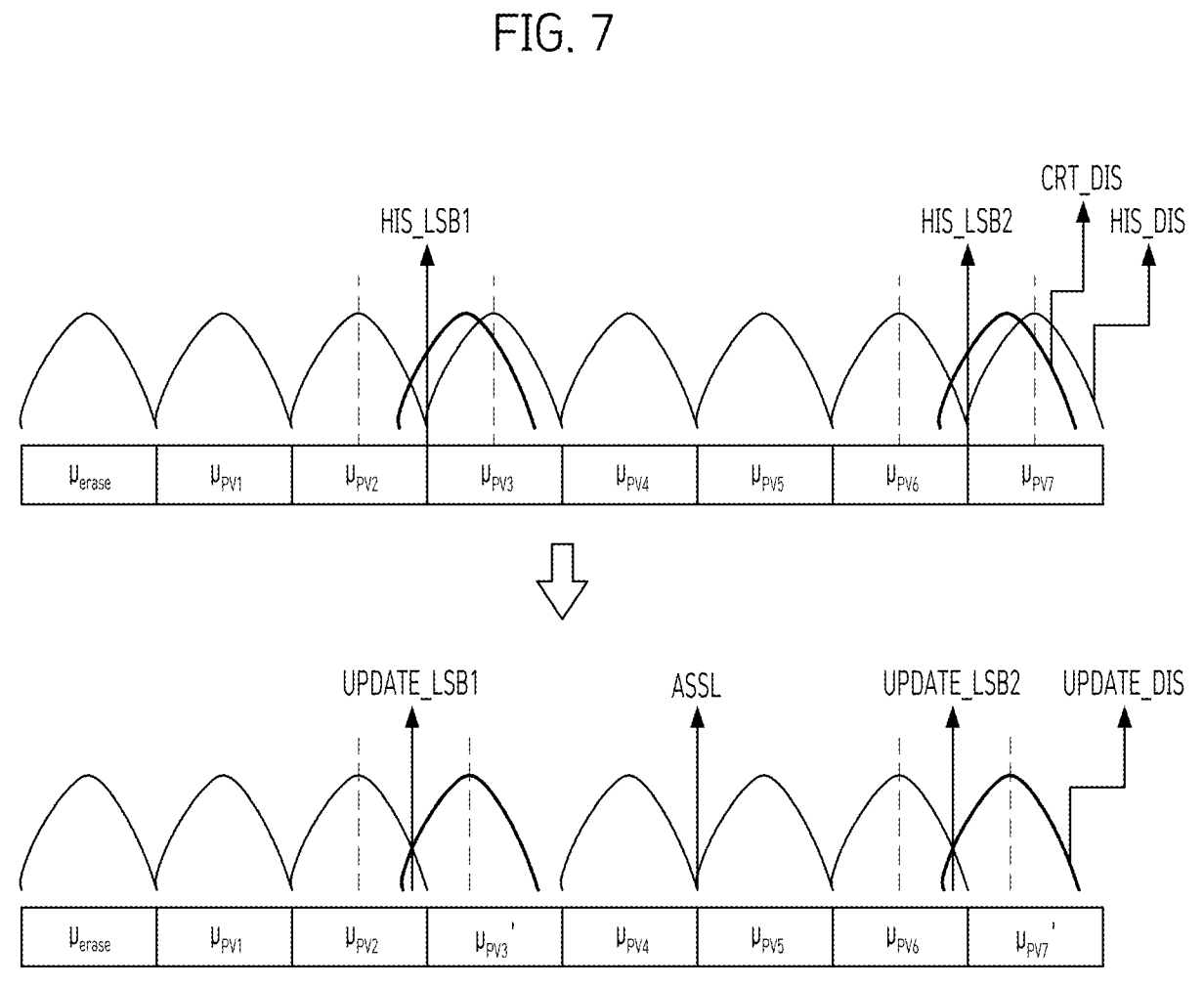

HIS_DIS
CRT_DIS
HIS_LSB2
HIS_LSB1
$\mu_{erase}$ $\mu_{PV1}$ $\mu_{PV2}$ $\mu_{PV3}$ $\mu_{PV4}$ $\mu_{PV5}$ $\mu_{PV6}$ $\mu_{PV7}$ UPDATE_DIS
UPDATE_LSB2
ASSL
UPDATE_LSB1
$\mu_{erase}$ $\mu_{PV1}$ $\mu_{PV2}$ $\mu_{PV3}'$ $\mu_{PV4}$ $\mu_{PV5}$ $\mu_{PV6}$ $\mu_{PV7}'$

FIG. 8

CSB1 ASSC1 CSB2 ASSC2 CSB3

| | $\mu_{erase}$, $\mu_{PV1}$ | $\mu_{PV2}$ | $\mu_{PV3}$ | $\mu_{PV4}$ | $\mu_{PV5}$ | $\mu_{PV6}$, $\mu_{PV7}$ |
|---|---|---|---|---|---|---|
| SEL_CNTC<1:3> | 1 | 0 | 0 | 1 | 1 | 0 |
| ASS_CNTC1 | 1 | 1 | 0 | 0 | 0 | 0 |
| ASS_CNTC2 | 1 | 1 | 1 | 1 | 0 | 0 |
| FIRST_CNTC<1:3> | 111 | 011 | 001 | 101 | 100 | 000 |

MSB1 ASSM MSB2

| | $\mu_{erase}$ | $\mu_{PV1}$ | $\mu_{PV2}$ | $\mu_{PV3}$ | $\mu_{PV4}$ | $\mu_{PV5}$ | $\mu_{PV6}$ | $\mu_{PV7}$ |
|---|---|---|---|---|---|---|---|---|
| SEL_CNTM<1:2> | 1 | 0 | | 0 | | 1 | | |
| ASS_CNTM | 1 | 1 | | 0 | | 0 | | |
| FIRST_CNTM<1:2> | 11 | 01 | | 00 | | 10 | | |

MEMORY CONTROLLER FOR PERFORMING READ OPERATION AND OPERATING METHOD THEREOF

CROSS-REFERENCE TO RELATED APPLICATION

This application claims priority under 35 U.S.C. § 119 (a) to Korean Patent Application No. 10-2024-0108347, filed on Aug. 13, 2024, the entire contents of which are incorporated herein by reference.

BACKGROUND

1. Field

Embodiments of the present disclosure relate to a data processing device, and particularly, to a memory controller for effectively performing a read operation and an operating method thereof.

2. Discussion of the Related Art

Memory systems are storage devices embodied using a semiconductor such as silicon (Si), germanium (Ge), gallium arsenide (GaAs), indium phosphide (InP), or the like. The memory systems are classified into a volatile memory device and a nonvolatile memory device. The volatile memory device is a memory device in which data stored therein is lost when power supply is interrupted. Representative examples of the volatile memory device include static RAM (SRAM), dynamic RAM (DRAM), synchronous DRAM (SDRAM), etc. The nonvolatile memory device is a memory device in which data stored therein is retained even when power supply is interrupted. Representative examples of the nonvolatile memory device include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc. Flash memories are chiefly classified into a NOR-type memory and a NAND-type memory. Improving memory devices may include integrated control of different types of memories, reduced power consumption, increased reliability of data retention, protection against potential modification of data due to interruption of power supply, and/or reduced manufacturing costs.

SUMMARY

Various embodiments of the present disclosure are directed to providing a memory controller capable of determining an optimal read level while minimizing additional read operations even when a read operation fails, and an operating method thereof.

Technical problems to be solved by the present disclosure are not limited to the aforementioned technical problems and the other unmentioned technical problems will be clearly understood by those skilled in the art from the following description.

An aspect of an embodiment in the disclosure, a memory controller for controlling a memory device comprising a plurality of memory cells, the memory controller may include: a history voltage storage unit configured to store information on a plurality of history average voltages, each representing an average voltage of each of a plurality of threshold voltage distributions for the plurality of memory cells; a read operation control unit configured to control the memory device to perform a read operation on a memory cell selected from among the plurality of memory cells; and a read voltage setting unit configured to, when a read operation performed under the control of the read operation control unit using a read voltage fails, determine a first cell count representing a number of cells measured to have a specific value based on the read voltage, determine a second cell count representing a number of cells predicted to have the specific value based on the read voltage through a first arithmetic operation performed based on an average voltage that is adjacent to the read voltage and selected from among the plurality of history average voltages, adjust a level of the average voltage through a second arithmetic operation performed based on a difference between the first cell count and the second cell count, and adjust a level of the read voltage based on the adjusted level of the average voltage.

An aspect of an embodiment in the disclosure, an operating method of a memory controller for controlling a memory device comprising a plurality of memory cells, the operating method may include: a step of storing information on a plurality of history average voltages, each representing an average voltage of each of a plurality of threshold voltage distributions for the plurality of memory cells; a read operation step of performing a read operation using a read voltage on a selected memory cell among the plurality of memory cells; a first counting step of, when the read operation fails, determining a first cell count that represents a number of cells measured to have a specific value based on the read voltage; a second counting step of, when the read operation fails, determining a second cell count that represents a number of cells predicted to have the specific value based on the read voltage through a first arithmetic operation performed based on an average voltage that is adjacent to the read voltage and selected from among the plurality of history average voltages; and a step of, following the first and second counting steps, adjusting a level of the average voltage by performing a second arithmetic operation based on a difference between the first and second cell counts, and then adjusting a level of the read voltage based on the adjusted level of the average voltage.

Even when a read operation fails, the present technology may determine a difference between a cell count predicted through Gaussian modeling and a cell count measured in the failed read operation, and calculate an optimal read level by applying a value of the difference to Gauss-Newton optimization.

In particular, the present technology can minimize the number of additional read operations required to accurately determine the cell count measured in the failed read operation.

Through this, the optimal read level can be effectively calculated, even with the minimized number of additional read operations performed following the failed read operation.

BRIEF DESCRIPTION OF THE DRAWINGS

FIG. 2 illustrates a detailed configuration and operation of the memory controller in accordance with an embodiment of the present disclosure.

FIG. 5 illustrates a pattern for reading data from a memory device set to a triple level cell in accordance with an embodiment of the present disclosure.

FIGS. 6 and 7 describe an auxiliary read operation performed by the memory controller when a least significant bit (LSB) read operation fails in the data read pattern illustrated in FIG. 5.

FIGS. 8 and 9 describe an auxiliary read operation performed by the memory controller when a central significant bit (CSB) read operation fails in the data read pattern illustrated in FIG. 5.

FIGS. 10 and 11 describe an auxiliary read operation performed by the memory controller when a most significant bit (MSB) read operation fails in the data read pattern illustrated in FIG. 5.

DETAILED DESCRIPTION

Figure 1:
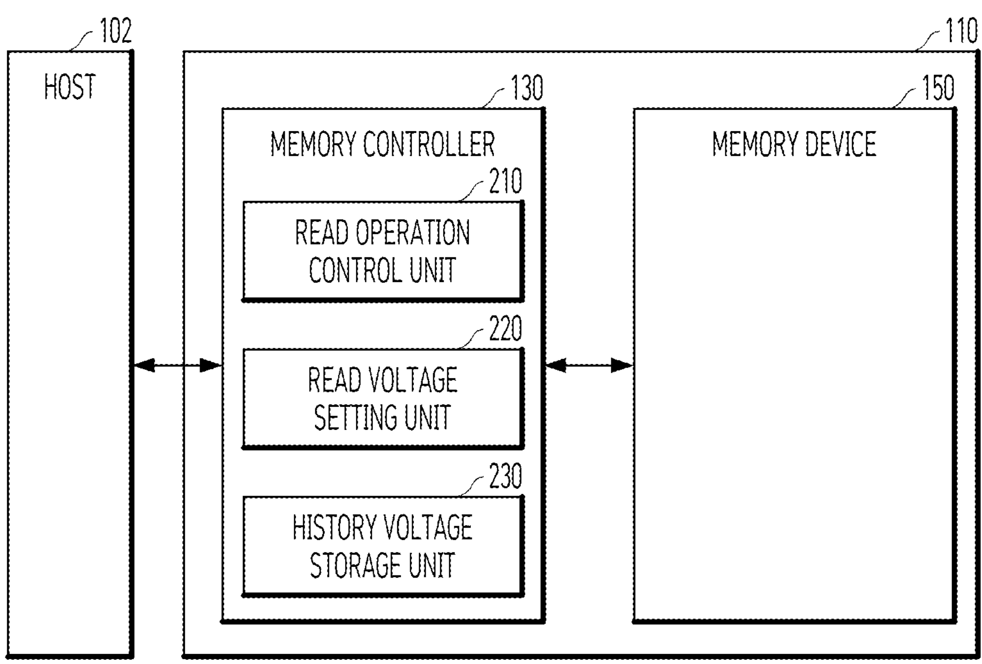
FIG. 1 illustrates a data processing system including a memory controller in accordance with an embodiment of the present disclosure.

Various embodiments of the present disclosure are described below with reference to the accompanying drawings. Elements and features of the disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware—for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in the disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits.

According to an embodiment, the data item may include a discrete object. According to another embodiment, the data item may include a unit of information within a transmission packet between two different components.

FIG. 1 illustrates a data processing system in accordance with an embodiment of the present disclosure.

Referring to FIG. 1, the data processing system may include a storage device 110 and a host 102. The storage device 110 may include a memory device 150 and a memory controller 130 configured to control operations of the memory device 150. The storage device 110 may store data under the control of the host 102, such as a mobile phone, a smart phone, an MP3 player, a laptop computer, a desktop computer, a game console, a TV, a tablet PC, an in-vehicle infotainment, or the like.

The storage device 110 may be implemented as any one of various types of storage devices according to a host interface that is a communication scheme with the host 102. For example, the storage device 110 may be implemented with any of a variety of types of storage devices, such as a Solid State Drive (SSD), a Multi-Media Card (MMC), an Embedded MMC (eMMC), a Reduced Size MMC (RS-MMC), a micro-MMC (micro-MMC), a Secure Digital (SD) card, a mini-SD card, a micro-SD card, a Universal Serial Bus (USB) storage device, a Universal Flash Storage (UFS) device, a Compact Flash (CF) card, a Smart Media Card (SMC), a memory stick, and the like.

The storage device 110 may be embodied in any of various kinds of package types. For example, the storage device 110 may be manufactured as any one of various kinds of package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 150 may store data. The memory device 150 operates under the control of the memory controller 130. The memory device 150 may include a memory cell array including a plurality of memory cells for storing data.

Each of the memory cells may be configured as a single level cell (SLC) storing one-bit data, a multi-level cell (MLC) storing two-bit data, a triple level cell (TLC) storing three-bit data, or a quad level cell (QLC) storing four-bit data.

The memory cell array may include a plurality of planes. Each plane may include a plurality of memory blocks. Each memory block may include a plurality of memory cells. One memory block may include a plurality of pages. In an embodiment, each page may be a unit by which data is stored in the memory device 150 or by which data stored in the memory device 150 is read.

A memory block may be a unit by which data is erased.

In the present specification, for convenience of description, a description will be made on the assumption that the memory device 150 is a NAND flash memory.

The memory device 150 may receive a command and an address from the memory controller 130, and may access an area of the memory cell array that is selected by the address. That is, the memory device 150 may perform an operation indicated by the command on the area selected by the address. For example, the memory device 150 may perform a write operation (i.e., program operation), a read operation, and an erase operation. During a program operation, the memory device 150 may program data to the area selected by the address. During a read operation, the memory device 150 may read data from the area selected by the address. During an erase operation, the memory device 150 may erase data stored in the area selected by the address.

The memory controller 130 controls the overall operation of the storage device 110.

When power is applied to the storage device 110, the memory controller 130 may run firmware (FW). When the memory device 150 is a flash memory device, the memory controller 130 may run firmware such as a flash translation layer (FTL) for controlling communication between the host 102 and the memory device 150.

In an embodiment, the memory controller 130 may receive data and a logical block address (LBA) from the host 102, and may translate the logical block address into a physical block address (PBA) indicating the address of memory cells which are included in the memory device 150 and in which data is to be stored.

The memory controller 130 may control the memory device 150 so that a program operation, a read operation, or an erase operation is performed in response to a request received from the host 102. During a program operation, the memory controller 130 may provide a program command, a physical block address, and data to the memory device 150.

During a read operation, the memory controller 130 may provide a read command and a physical block address to the memory device 150. During an erase operation, the memory controller 130 may provide an erase command and a physical block address to the memory device 150.

In an embodiment, the memory controller 130 may generate a command, an address, and data regardless of a request from the host 102, and may transmit the command, the address, and the data to the memory device 150. For example, the memory controller 130 may provide commands, addresses, and data to the memory device 150 so as to perform background operations, such as a program operation for wear leveling and a program operation for garbage collection.

In an embodiment, the memory controller 130 may control two or more memory devices 100. In such case, the memory controller 130 may control the memory devices 100 depending on an interleaving scheme to improve operating performance. The interleaving scheme may be an operating manner in which the operating periods of the at least two memory devices 100 overlap each other.

The host 102 may communicate with the storage device 110 using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods.

In an embodiment, the memory controller 130 may include a read operation control unit 210, a read voltage setting unit 220, and a history voltage storage unit 230. In an embodiment, the memory controller 130 may be implemented with at least one of a processor, a memory, or a register.

The read operation control unit 210 may control the memory device 150 to read data stored in selected memory cells among the memory cells included in the memory device 150. Specifically, the read operation control unit 210 may control the memory device 150 to drive a selected word line coupled to the selected memory cells by applying a read voltage to the selected word line. The read operation control unit 210 may receive a read voltage from the read voltage setting unit 220 and supply the read voltage to the selected word line.

When an operation of using a default read voltage to read the data stored in the selected memory cells coupled to the selected word line fails, the read operation control unit 210 may control the memory device 150 to use a different read voltage such as an optimum (i.e., adjusted) read voltage to read the data stored in the selected memory cells coupled to the selected word line.

In addition, when the read operation using the default read voltage fails, the read operation control unit 210 may control the memory device 150 to perform an auxiliary read operation for reading the data stored in the selected memory cells by applying an auxiliary read voltage to the selected word line. When the read operation fails, the read operation control unit 210 may receive the auxiliary read voltage from the read voltage setting unit 220.

The history voltage storage unit 230 may store information on a plurality of history average voltages, each representing an average voltage of each of a plurality of threshold voltage distributions for a plurality of memory cells.

The plurality of history average voltages may represent average voltages of threshold voltage distributions for the plurality of memory cells, obtained when the most recent read operation, among read operations performed on the same plane or the same memory block, is successfully performed.

When the read operation is successfully performed, the history voltage storage unit 230 may update previously stored history average voltages with average voltages of threshold voltage distributions for memory cells at that time, and store the updated voltages as the plurality of history average voltages.

The read voltage setting unit 220 may provide the read operation control unit 210 with information on a read voltage to be applied to the selected word line during the read operation.

In addition, the read voltage setting unit 220 may provide the read voltage to the read operation control unit 210 so that the read operation control unit 210 controls the execution of the read operation.

When the read operation fails, the read voltage setting unit 220 may determine a first cell count by performing the read operation, which represents the number of cells measured to have a specific value based on the read voltage. The cells measured to have the specific value may include those identified as either On-Cells or Off-Cells in the read operation.

The read voltage setting unit 220 may perform a first arithmetic operation based on an average voltage that is adjacent to the read voltage and selected from among the plurality of history average voltages stored in the history voltage storage unit 230. As a result of performing the first arithmetic operation, the read voltage setting unit 220 may determine a second cell count, representing the number of cells predicted to have the specific value based on the read voltage. The cells predicted to have the specific value may include those predicted to be either On-Cells or Off-Cells as the result of the first arithmetic operation.

The read voltage setting unit 220 may perform a second arithmetic operation based on a difference between the first cell count and the second cell count, and adjust a level of the average voltage based on a result of the second arithmetic operation.

The read voltage setting unit 220 may adjust the level of the average voltage and then adjust a level of the read voltage based on the adjusted level of the average voltage.

The read voltage setting unit 220 may update the plurality of history average voltages stored in the history voltage storage unit 230 with the adjusted level of the average voltage, and adjust the level of the read voltage by referring to the updated history average voltages.

The read voltage setting unit 220 may adjust the level of the read voltage, and then provide information on the adjusted read voltage to the read operation control unit 210.

The read operation control unit 210 may control the memory device 150 to perform the read operation again using the adjusted read voltage provided from the read voltage setting unit 220.

Figure 2:
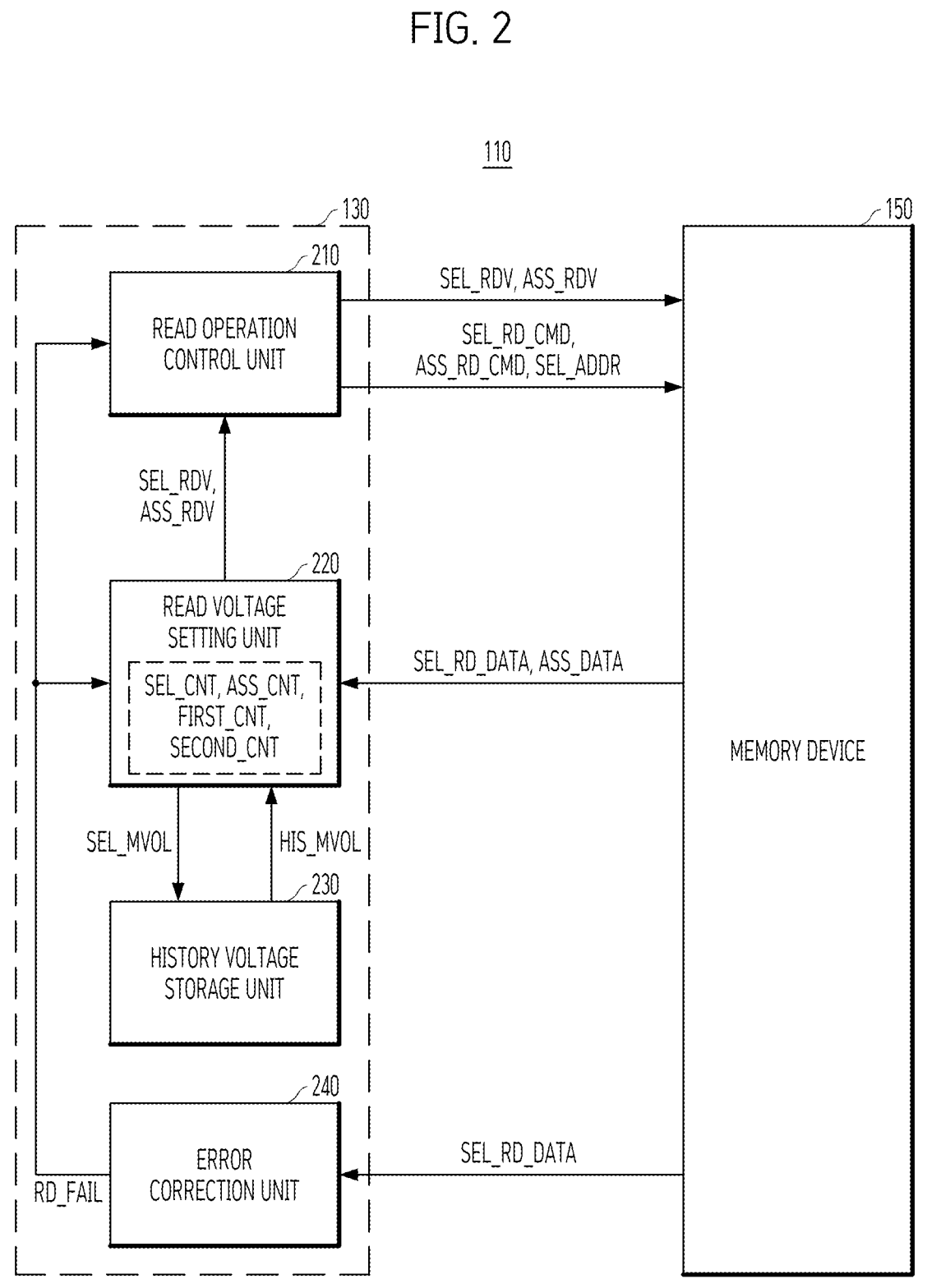

FIG. 2 illustrates a detailed configuration and operation of a memory controller in accordance with an embodiment of the present disclosure. The memory controller shown in FIG. 2 may correspond to the memory controller 130 illustrated in FIG. 1.

Referring to FIGS. 1 and 2, the memory controller 130 may include the read operation control unit 210, the history voltage storage unit 230, and the read voltage setting unit 220. The memory controller 130 may further include an error correction unit 240.

The read operation control unit 210 may provide the memory device 150 with read commands SEL_RD_CMD and ASS_RD_CMD for reading data stored in memory cells selected from among the memory cells included in the memory device 150, read voltages SEL_RDV and ASS_RDV, and an address SEL_ADDR designating an area where data RD_DATA to be read is stored. Specifically, the read operation control unit 210 may provide the memory device 150 with the commands SEL_RD_CMD and ASS_RD_CMD for setting the read voltages SEL_RDV and ASS_RDV to be applied to a selected word line (not illustrated) connected to the selected memory cells (not illustrated).

The read operation control unit 210 may receive the read voltages SEL_RDV and ASS_RDV to be applied to the selected word line from the read voltage setting unit 220.

The read operation control unit 210 may provide the memory device 150 with the read command SEL_RD_CMD for reading the data RD_DATA by applying the read voltage SEL_RDV to the selected word line.

In addition, the read operation control unit 210 may provide the memory device 150 with the auxiliary read command ASS_RD_CMD for reading the data RD_DATA by applying the auxiliary read voltage ASS_RDV to the selected word line.

The read voltage SEL_RDV may be a default read voltage determined in advance in a manufacturing stage in order to read data.

The auxiliary read voltage ASS_RDV is a voltage whose level is determined according to the level of the read voltage SEL_RDV. When a read operation using the read voltage SEL_RDV fails, the auxiliary read voltage ASS_RDV may be provided from the read voltage setting unit 220 to the read operation control unit 210 in order to compensate the result of the failed read operation. That is, after receiving the auxiliary read voltage ASS_RDV from the read voltage setting unit 220, the read operation control unit 210 may control the memory device 150 to perform an auxiliary read operation using the auxiliary read voltage ASS_RDV.

According to an embodiment, when the read operation using the default read voltage SEL_RDV fails, the read operation control unit 210 may receive the auxiliary read voltage ASS_RDV from the read voltage setting unit 220 to perform the auxiliary read operation.

In an embodiment, the read operation control unit 210 may control the memory device 150 to perform N read operations by applying N read voltages SEL_RDV at different levels to a selected word line, respectively. N may be a natural number equal to or greater than 1. That is, the read operation control unit 210 may control the memory device

150 to perform the N read operations in succession by receiving the N read voltages SEL_RDV from the read voltage setting unit 220.

When the N read operations fail, the read operation control unit 210 may control the memory device 150 to perform N−1 auxiliary read operations by applying N−1 auxiliary read voltages ASS_RDV to the selected word line, respectively. That is, the read operation control unit 210 may control the memory device 150 to perform the N−1 auxiliary read operations in succession by receiving N−1 auxiliary read voltages ASS_RDV from the read voltage setting unit 220.

According to an embodiment, when N is 1, the read operation control unit 210 may perform no auxiliary read operation even though the read operation fails.

According to an embodiment, in a case where N is a natural number equal to or greater than 2, if a read operation fails at least twice, i.e., two read operations fail, the read operation control unit 210 may perform the auxiliary read operation at least once.

The read operation control unit 210 may receive read fail information RD_FAIL from the error correction unit 240, which indicates either success or failure of the read operation based on whether the number of error bits generated as a result of the read operation is equal to or less than a predetermined number. Using the read fail information RD_FAIL, the read operation control unit 210 may determine whether the read operation performed by the memory device 150 has succeeded or failed.

When the N read operations are performed, the read operation control unit 210 may receive read fail information RD_FAIL from the error correction unit 240, which indicates either success or failure of the N read operations based on whether the total number of error bits generated as a result of the N read operations performed in succession is equal to or less than a predetermined number. Using the read fail information RD_FAIL, the read operation control unit 210 may determine whether the N read operations performed in succession by the memory device 150 have succeeded or failed.

The history voltage storage unit 230 may store information on the plurality of history average voltages HIS_MVOL. Each of the plurality of history average voltages represents the average voltage of each of the plurality of threshold voltage distributions for the plurality of memory cells. The history voltage storage unit 230 may provide the stored information on the plurality of history average voltages HIS_MVOL to the read voltage setting unit 220.

For example, when the plurality of memory cells are single level cells (SLCs) that each store one-bit data, the history voltage storage unit 230 may store information on two history average voltages HIS_MVOL, which represent average voltages of two threshold voltage distributions. When the plurality of memory cells are multi-level cells (MLCs) that each store two-bit data, the history voltage storage unit 230 may store information on four history average voltages HIS_MVOL, which represent average voltages of four threshold voltage distributions. When the plurality of memory cells are triple level cells (TLCs) that each store three-bit data, the history voltage storage unit 230 may store information on eight history average voltages HIS_MVOL, which represent average voltages of eight threshold voltage distributions. When the plurality of memory cells are quad level cells (QLCs), each capable of storing four-bit data, the history voltage storage unit 230 may store information on sixteen history average voltages HIS_MVOL, which represent average voltages of sixteen threshold voltage distributions.

According to an embodiment, the information on the plurality of history average voltages HIS_MVOL may represent the average voltages of the threshold voltage distributions for the plurality of memory cells at the time of the most recent successful read operation among read operations performed on the same plane or memory block.

For example, a plurality of history average voltages may correspond to one memory block including a plurality of memory cells. In this case, the history voltage storage unit 230 may store information on the plurality of history average voltages HIS_MVOL corresponding to each memory block. Alternatively, a plurality of history average voltages may correspond to one plane including a plurality of memory cells. In this case, the history voltage storage unit 230 may store information on the plurality of history average voltages HIS_MVOL corresponding to each plane.

The read voltage setting unit 220 may provide the read operation control unit 210 with the read voltages SEL_RDV and ASS_RDV to be applied to the selected word line during the read operation.

In particular, the read voltage setting unit 220 may provide the read voltage SEL_RDV to the read operation control unit 210 so that the read operation control unit 210 controls the execution of the read operation.

Subsequently, the read voltage setting unit 220 may receive the read fail information RD_FAIL indicating whether the read operation has succeeded or failed from the error correction unit 240. Using the read fail information RD_FAIL, the read voltage setting unit 220 may determine whether the read operation performed by the memory device 150 has succeeded or failed under the control of the read operation control unit 210.

When the read operation performed by providing the read voltage SEL_RDV to the read operation control unit 210 fails, the read voltage setting unit 220 may determine a first cell count FIRST_CNT, representing the number of cells measured to have a specific value based on the read voltage SEL_RDV in the failed read operation.

The cells measured to have the specific value may include those identified as either On-Cells or Off-Cells in the read operation. The value of the first cell count FIRST_CNT may represent the number of set logic values included in read data SEL_RD_DATA output from the memory device 150 by applying the read voltage SEL_RDV to the selected word line.

Subsequently, the read voltage setting unit 220 may perform a first arithmetic operation based on an average voltage SEL_MVOL that is adjacent to the read voltage SEL_RDV and selected from among the plurality of history average voltages HIS_MVOL stored in the history voltage storage unit 230. As a result of the first arithmetic operation, the read voltage setting unit 220 may determine a second cell count SECOND_CNT, representing the number of cells predicted to have a specific value based on the read voltage SEL_RDV. The cells predicted to have the specific value may include those predicted to be either On-Cells or Off-Cells as the result of the first arithmetic operation.

The read voltage setting unit 220 may determine N second cell counts SECOND_CNT, each representing the number of cells predicted to have a specific value based on each of the N read voltages SEL_RDV, as a result of performing N first arithmetic operations based on N average voltages SEL_MVOL that are adjacent to the N read voltages SEL_RDV and selected from among the plurality of history average voltages HIS_MVOL stored in the history voltage storage unit 230.

The first arithmetic operation, as described in FIG. 3 and Equation 1 below, may predict the number of memory cells to be counted as having a specific value in a read operation to be performed using Gaussian Modeling based on a specific read voltage. For example, the first arithmetic operation may be performed, based on the average voltage SEL_MVOL, to determine the second cell count SECOND_CNT representing the number of memory cells to be counted as having the specific value in the read operation to be performed using Gaussian modeling based on the read voltage SEL_RDV.

Subsequently, the read voltage setting unit 220 may perform the second arithmetic operation based on the difference between the first cell count FIRST_CNT and the second cell count SECOND_CNT, and adjust the level of the average voltage SEL_MVOL based on a result of the second arithmetic operation.

The read voltage setting unit 220 may perform N second arithmetic operations based on the difference between each of the N first cell counts FIRST_CNT and a corresponding one of the N second cell counts SECOND_CNT, and adjust the level of each of the N average voltages SEL_MVOL based on results of the N second arithmetic operations.

The second arithmetic operation, as described in FIG. 4 and Equations 2 and 3 below, may apply the difference between the predicted and measured numbers of memory cells obtained with regard to a read operation to be performed using a specific read voltage to Gauss-Newton optimization, adjusting the level of a specific history average voltage that is adjacent to the specific read voltage.

That is, the second arithmetic operation may apply the difference between the first cell count FIRST_CNT measured to have a specific value in a read operation actually performed by the read operation control unit 210 based on the read voltage SEL_RDV and the second cell count SECOND_CNT predicted through the first arithmetic operation to Gauss-Newton optimization, and adjust the level of the average voltage SEL_MVOL that is adjacent to the read voltage SEL_RDV.

More specifically, when the read operation fails, the read voltage setting unit 220 may determine the first cell count FIRST_CNT in the failed read operation in the following manner.

First, the read voltage setting unit 220 may determine N third cell counts SEL_CNT, each representing the number of cells measured to have a specific value based on each of the N read voltages SEL_RDV during the N read operations performed by the read operation control unit 210.

The cells measured to have the specific value may include those identified as either On-Cells or Off-Cells in each of the N read operations. The value of each of the N third cell counts SEL_CNT may represent the number of set logic values included in each of the N read data SEL_RD_DATA output from the memory device 150 by applying each of the N read voltages SEL_RDV to the selected word line.

When the N read operations fail, the read voltage setting unit 220 may determine N−1 different auxiliary read voltages ASS_RDV according to N different read voltages SEL_RDV used in the N read operations, and provide the N−1 different auxiliary read voltages ASS_RDV to the read operation control unit 210 so that N−1 auxiliary read operations are performed. Here, N may be a natural number equal to or greater than 1.

According to an embodiment, when N is 1, the read voltage setting unit 220 may provide no auxiliary read voltage ASS_RDV to the read operation control unit 210 even though the read operation performed by the read operation control unit 210 fails. Accordingly, when N is 1, the read voltage setting unit 220 may prevent the auxiliary read operation from being performed in the read operation control unit 210.

According to an embodiment, when N is equal to or greater than 2, if a read operation performed by the read operation control unit 210 fails at least twice, the read voltage setting unit 220 may provide at least one auxiliary read voltage ASS_RDV to the read operation control unit 210 so that at least one auxiliary read operation is performed.

In addition, the read voltage setting unit 220 may determine N−1 fourth cell counts ASS_CNT, each representing the number of cells measured to have a specific value based on each of the N−1 auxiliary read voltages ASS_RDV during the N−1 auxiliary read operations performed by the read operation control unit 210.

The cells measured to have the specific value may include those identified as either On-Cells or Off-Cells in each of the N−1 auxiliary read operations. The value of each of the N−1 fourth cell counts ASS_CNT may represent the number of set logic values included in each of the N−1 auxiliary data ASS_DATA acquired from the memory device 150 by applying each of the N−1 auxiliary read voltages ASS_RDV to the selected word line.

In addition, the read voltage setting unit 220 may perform a third arithmetic operation between the N third cell counts SEL_CNT and the N−1 fourth cell counts ASS_CNT to determine the N first cell counts FIRST_CNT.

According to an embodiment, when N is 1, the read voltage setting unit 220 may determine one third cell count SEL_CNT as one first cell count FIRST_CNT without performing the third arithmetic operation.

According to an embodiment, when N is equal to or greater than 2, the read voltage setting unit 220 may perform the third arithmetic operation between at least two third cell counts SEL_CNT and at least one fourth cell count ASS_CNT to determine at least two first cell counts FIRST_CNT.

Accordingly, the third arithmetic operation may be performed only when N is equal to or greater than 2. In addition, the third arithmetic operation may involve accurately measuring a logic value distinguished by at least two first cell counts FIRST_CNT by combining at least two logic values signified by at least two third cell counts SEL_CNT and at least one logic value signified by at least one fourth cell count ASS_CNT.

It may not be determined whether the N−1 auxiliary read operations performed by the read operation control unit 210 have failed. That is, data ASS_DATA, resulting from the N−1 auxiliary read operations performed in the read operation control unit 210, may not be applied to the error correction unit 240. This is because the auxiliary read operation is required for the third arithmetic operation performed inside the read voltage setting unit 220. A detailed description of the third arithmetic operation performed by the read voltage setting unit 220 when N is equal to or greater than 2 is given with reference to FIGS. 5 to 11 below.

Subsequently, the read voltage setting unit 220 may adjust the level of the average voltage SEL_MVOL through the second arithmetic operation performed based on the difference between the first cell count FIRST_CNT and the second cell count SECOND_CNT, and then adjust the level of the read voltage SEL_RDV based on the adjusted level of the average voltage SEL_MVOL.

The read voltage setting unit 220 may adjust the level of each of the N average voltages SEL_MVOL through the N second arithmetic operations performed based on the difference between each of the N first cell counts FIRST_CNT and a corresponding one of the N second cell counts SECOND_CNT, and then adjust the level of the N read voltages SEL_RDV based on the adjusted levels of the N average voltages SEL_MVOL, respectively.

The read voltage setting unit 220 may update the plurality of history average voltages HIS_MVOL stored in the history voltage storage unit 230 with the adjusted levels of the N average voltages SEL_MVOL, and then adjust the level of each of the N read voltages SEL_RDV by referring to the updated history average voltages HIS_MVOL.

In addition, the read voltage setting unit 220 may provide information on the adjusted N read voltages SEL_RDV to the read operation control unit 210.

A detailed description for the operation of adjusting the level of the read voltage SEL_RDV based on the average voltage SEL_MVOL with a level adjusted in the read voltage setting unit 220 is given with reference to FIGS. 5 to 11 below.

Subsequently, the read operation control unit 210 may perform the N read operations again by using the N adjusted read voltages SEL_RDV provided from the read voltage setting unit 220, respectively.

The error correction unit 240 may acquire read data SEL_RD_DATA resulting from the N read operations performed in the memory device 150 under the control of the read operation control unit 210. That is, the error correction unit 240 may perform error correction decoding on the read data SEL_RD_DATA. In such a case, when the number of failed bits included in the read data SEL_RD_DATA is equal to or less than the number of bits that can be corrected by the error correction unit 240, the error correction decoding may succeed. On the other hand, when the number of failed bits included in the read data SEL_RD_DATA exceeds the number of bits that can be corrected by the error correction unit 240, the error correction decoding may fail.

In addition, when the error correction decoding for the read data SEL_RD_DATA succeeds, the error correction unit 240 may determine that the N read operations performed by the memory device 150 are successful. On the other hand, when the error correction decoding for the read data SEL_RD_DATA fails, the error correction unit 240 may determine that the N read operations performed by the memory device 150 fail. Subsequently, the error correction unit 240 may generate read fail information RD_FAIL indicating whether the N read operations performed by the memory device 150 are successful or fail. Subsequently, the error correction unit 240 may provide the generated read fail information RD_FAIL to the read operation control unit 210 and the read voltage setting unit 220.

Figure 3:
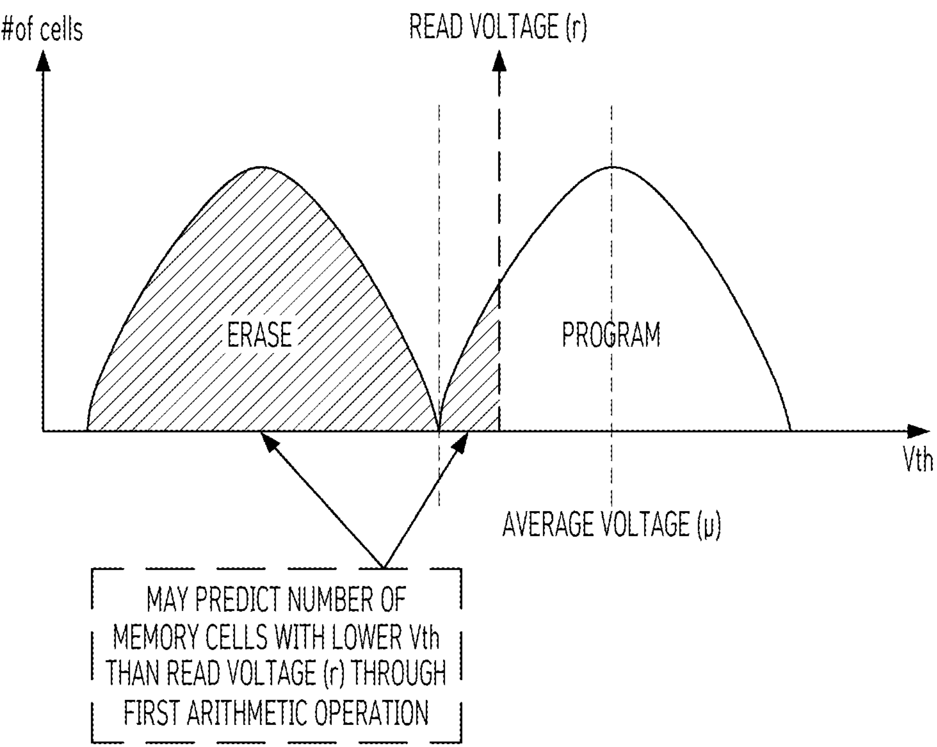
FIG. 3 describes a method for predicting the number of memory cells in a read operation performed based on a specific read voltage through Gaussian modeling in the memory controller in accordance with an embodiment of the present disclosure.

FIG. 3 describes a method for predicting the number of memory cells in a read operation performed based on a specific read voltage through Gaussian modeling in the memory controller in accordance with an embodiment of the present disclosure.

Referring to FIG. 3, when the plurality of memory cells are single level cells that each store one-bit data, the number of memory cells expected to have a specific value in a read operation based on a specific read voltage r for the plurality of memory cells may be predicted.

First, assuming that a value of the specific read voltage r, a value of an average voltage μ adjacent to the specific read voltage r, and a value of a variable 'σ' are known, Equation 1 for a first arithmetic operation of predicting the number of memory cells having a threshold voltage (Vth) lower than the specific read voltage r when the read operation is performed based on the specific read voltage r, using Gaussian Modeling, is as follows.

$$F(r;\mu,\sigma)=\frac{1}{\sigma\sqrt{2\pi}}\int_{-\infty}^{r}\exp\left(-\frac{(t-\mu)^2}{2\sigma^2}\right)dt \qquad \text{Equation 1}$$

Referring to FIGS. 1 and 2 together with FIG. 3, the read voltage setting unit 220 knows the values of the N read voltages SEL_RDV and the values of the N average voltages SEL_MVOL respectively adjacent to the N read voltages SEL_RDV and selected from among the plurality of history average voltages HIS_MVOL stored in the history voltage storage unit 230, and the value of the variable 'σ' may be set by a designer.

Accordingly, the read voltage setting unit 220 may perform N first arithmetic operations based on the N read voltages SEL_RDV and the N average voltages SEL_MVOL, respectively.

In addition, the read voltage setting unit 220 may predict the number of memory cells having a threshold voltage (Vth) lower than each of the N read voltages SEL_RDV, among the plurality of memory cells selected as read targets, as results of the N first arithmetic operations, thereby determining N second cell counts SECOND_CNT.

Figure 4:
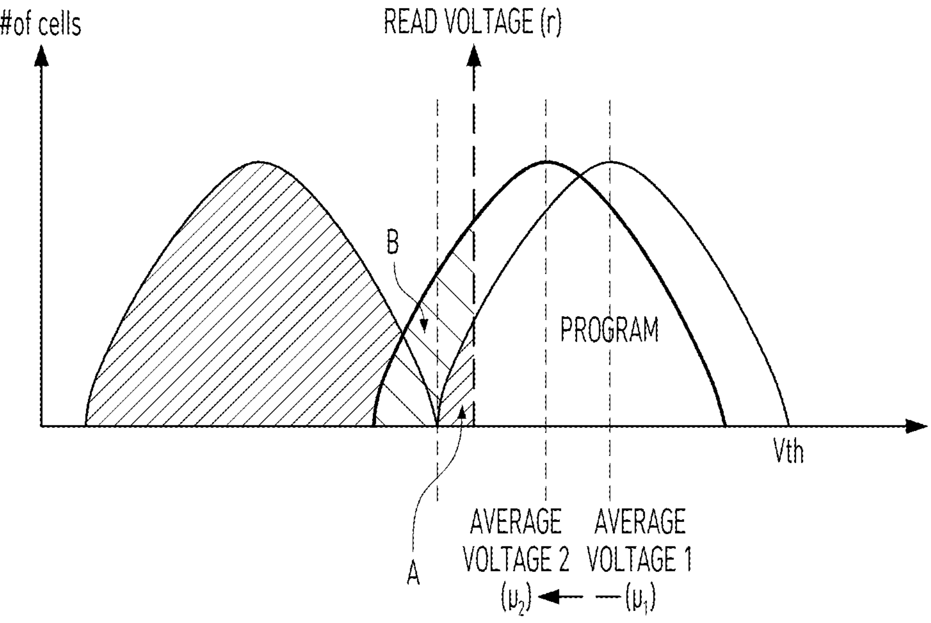
FIG. 4 describes a method of applying a difference between a predicted memory cell count and a measured memory cell count to Gauss-Newton optimization in the memory controller in accordance with an embodiment of the present disclosure.

FIG. 4 describes a method of applying a difference between a predicted memory cell count and a measured memory cell count to Gauss-Newton optimization in the memory controller in accordance with an embodiment of the present disclosure.

Referring to FIG. 4, when the plurality of memory cells are single level cells that each store one-bit data, the level of a specific history average voltage adjacent to the specific read voltage r may be adjusted by using the difference between the number of memory cells predicted in a read operation to be performed based on the specific read voltage r and the number of memory cells measured in the read operation performed based on the specific read voltage r.

First, assuming that a value of the specific read voltage r, a value of a specific average voltage 1 ($\mu_1$) adjacent to the specific read voltage r, a value of the variable 'σ', and a memory cell count, i.e., the number of memory cells, o measured in the read operation performed based on the specific read voltage r are known, the difference res may be calculated through Equation 2 by subtracting the number (B) of memory cells o measured in the read operation performed based on the specific read voltage r from the number (A) of memory cells predicted to have a threshold voltage (Vth) lower than the specific read voltage r in the read operation to be performed based on the specific read voltage r through Equation 1 described above.

$$res=\frac{1}{\sigma\sqrt{2\pi}}\int_{-\infty}^{r}\exp\left(-\frac{(t-\mu_1)^2}{2\sigma^2}\right)dt-o \qquad \text{Equation 2}$$

Subsequently, as shown in Equation 3 below, the first-order Taylor expansion and the Jacobian matrix J may be used to calculate the adjustment amount ($\Delta\mu_1$) for the value of the specific history average voltage 1 ($\mu_1$), adjacent to the specific read voltage r, to transform it into an average voltage 2 ($\mu_2$).

$$\text{let } f = res(\mu) \quad \text{Equation 3}$$

$$f(x) = f(a) + f'(a)(x-a)$$

$$\begin{aligned} S(\mu_1 + \Delta\mu_1) &= f(\mu_1 + \Delta\mu_1)^2 = (f(\mu_1) + f'(\mu_1)\Delta\mu_1)^2 \\ &= f(\mu_1)^2 + 2f(\mu_1)f'(\mu_1)\Delta\mu_1 + f'(\mu_1)^2\Delta\mu_1^2 \end{aligned}$$

$$\frac{ds}{d\Delta\mu} = 0 = 2f(\mu_1)f'(\mu_1) + 2f'(\mu_1)^2\Delta\mu_1$$

$$\Delta\mu_1 = \frac{-f(\mu_1)f'(\mu_1)}{f'(\mu_1)^2}$$

$$\mu_2 = \mu_1 + \Delta\mu_1$$

Referring to FIGS. 1 to 3 together with FIG. 4, the read voltage setting unit 220 may determine the N second cell counts SECOND_CNT through the N first arithmetic operations performed based on the N read voltages SEL_RDV and the N average voltages SEL_MVOL.

In addition, the read voltage setting unit 220 may obtain the values of the N first cell counts FIRST_CNT that are respectively measured through the N read operations performed by the read operation control unit 210.

Accordingly, the read voltage setting unit 220 may apply the difference between the first cell count FIRST_CNT and the second cell count SECOND_CNT determined through Equation 2 to Equation 3 to adjust the level of each of the N average voltages SEL_MVOL adjacent to a corresponding one of the N read voltages SEL_RDV.

FIG. 5 describes a pattern for reading data from a memory device set to a triple level cell TLC in the memory controller in accordance with an embodiment of the present disclosure.

Referring to FIG. 5, it may be seen that when the plurality of memory cells are triple level cells TLCs that each store three-bit data, they have eight threshold voltage distributions ERASE, PV1, PV2, PV3, PV4, PV5, PV6, and PV7.

Specifically, among the eight threshold voltage distributions ERASE, PV1, PV2, PV3, PV4, PV5, PV6, and PV7, the voltage distribution ERASE of an erase state and the voltage distributions PV1, PV2, and PV7 of first, second, and seventh program states may be set to a logic value '1' based on least significant bits (LSBs) LSB1 and LSB2, and the voltage distributions PV3, PV4, PV5, and PV6 of the remaining third to sixth program states may be set to a logic value '0' based on the LSB1 and LSB2.

Among the eight threshold voltage distributions ERASE, PV1, PV2, PV3, PV4, PV5, PV6, and PV7, the voltage distribution ERASE of the erase state and the voltage distributions PV1, PV4, and PV5 of the first, fourth, and fifth program states may be set to a logic value '1' based on central significant bits (CSBs) CSB1, CSB2, and CSB3, and the voltage distributions PV2, PV3, PV6, and PV7 of the remaining second, third, sixth, and seventh program states may be set to a logic value '0' based on the CSB1, CSB2, and CSB3.

Among the eight threshold voltage distributions ERASE, PV1, PV2, PV3, PV4, PV5, PV6, and PV7, the voltage distribution ERASE of the erase state and the voltage distributions PV5 to PV7 of the fifth to seventh program states may be set to a logic value '1' based on most significant bits (MSBs) MSB1 and MSB2, and the voltage distributions PV1 to PV4 of the remaining first to fourth program states may be set to a logic value '0' based on the MSB1 and MSB2.

Accordingly, a logic value of read data SEL_RD_DATA corresponding to the voltage distribution ERASE of the erase state may be '111.' A logic value of read data SEL_RD_DATA corresponding to the voltage distribution PV1 of the first program state may be '110.' A logic value of read data SEL_RD_DATA corresponding to the voltage distribution PV2 of the second program state may be '100.' A logic value of read data SEL_RD_DATA corresponding to the voltage distribution PV3 of the third program state may be '000.' A logic value of read data SEL_RD_DATA corresponding to the voltage distribution PV4 of the fourth program state may be '010.' A logic value of read data SEL_RD_DATA corresponding to the voltage distribution PV5 of the fifth program state may be '011.' A logic value of read data SEL_RD_DATA corresponding to the voltage distribution PV6 of the sixth program state may be '001.' A logic value of read data SEL_RD_DATA corresponding to the voltage distribution PV7 of the seventh program state may be '101.'

FIGS. 6 and 7 describe an auxiliary read operation performed by the memory controller in accordance with an embodiment of the present disclosure. The auxiliary read operation may be performed when a least significant bit (LSB) read operation fails in the data read pattern described with reference to FIG. 5.

Referring to FIGS. 1 to 4 together with FIGS. 5 and 6, when the plurality of memory cells included in the memory device 150 are triple level cells (TLCs) that each store three-bit data, and a read operation for reading LSB data among data stored in a selected memory cell fails, a subsequent operation to be performed by the read voltage setting unit 220 may be determined.

First, as described with reference to FIG. 5, an LSB read operation for a selected memory cell in a TLC state may include two LSB read operations using two LSB read voltages LSB1 and LSB2, respectively.

When the two LSB read operations using the two LSB read voltages LSB1 and LSB2 fail, the read voltage setting unit 220 may determine two third cell counts SEL_CNTL<1:2> representing the number of cells measured to have a specific value based on the two LSB read voltages LSB1 and LSB2, respectively.

In such a case, the first third-cell count SEL_CNTL1 measured based on the first LSB read voltage LSB1 may represent the number of memory cells having LSB logic values of '1.' However, the second third-cell count SEL_CNTL2 measured based on the second LSB read voltage LSB2 may not be considered to mean a specific LSB logic value because the number of memory cells having LSB logic values of '1' and the number of memory cells having LSB logic values of '0' are mixed in the second third-cell count SEL_CNTL2.

Accordingly, the read voltage setting unit 220 may determine a level of an LSB auxiliary read voltage ASSL based on the two LSB read voltages LSB1 and LSB2. For example, the read voltage setting unit 220 may determine a voltage corresponding to the mean of the two LSB read voltages LSB1 and LSB2 as the LSB auxiliary read voltage ASSL, as illustrated in FIG. 6.

Subsequently, the read voltage setting unit 220 may provide the LSB auxiliary read voltage ASSL to the read operation control unit 210 so that one auxiliary read operation is performed in the memory device 150.

The read voltage setting unit 220 may measure one LSB fourth cell count ASS_CNTL through the one auxiliary read operation performed based on the LSB auxiliary read voltage ASSL.

In addition, the read voltage setting unit 220 may perform a third arithmetic operation on the two LSB third cell counts SEL_CNTL<1:2> and the one LSB fourth cell count ASS_CNTL to determine two LSB first cell counts FIRST_CNTL<1:2>.

That is, the read voltage setting unit 220 may perform the third arithmetic operation on the two LSB third cell counts SEL_CNTL<1:2>, representing the number of cells measured to have a specific value based on the two LSB read voltages LSB1 and LSB2, and the one LSB fourth cell count ASS_CNTL measured based on the LSB auxiliary read voltage ASSL, so that memory cells having LSB logic values of '1' are distinguished by '11' and '10' and memory cells having LSB logic values of '0' are distinguished by '01' and '00' based on the two LSB third cell counts SEL_CNTL<1:2>.

Accordingly, the read voltage setting unit 220 may measure the number of memory cells having LSB logic values of '11' as the first LSB first cell count FIRST_CNTL1. In addition, the read voltage setting unit 220 may measure the number of memory cells having LSB logic values of '11,' '01,' and '00' as the second LSB first cell count FIRST_CNTL2.

In this way, it may be seen that the third arithmetic operation performed by the read voltage setting unit 220 is an arithmetic operation for accurately measuring a logic value by combining the logic value signified by the two LSB third cell counts SEL_CNTL<1:2> and the logic value signified by the one LSB fourth cell count ASS_CNTL when the logic value cannot be accurately distinguished using only the two LSB third cell counts SEL_CNTL<1:2>. As the result of the third arithmetic operation, the two LSB first cell counts FIRST_CNTL<1:2>, whose logic values are accurately distinguished, may be obtained.

Referring to FIG. 7, it may be seen that, when the plurality of memory cells included in the memory device 150 are triple level cells (TLCs) that each store three-bit data, eight history average voltages $\mu_{ERASE}$, $\mu_{PV1}$, $\mu_{PV2}$, $\mu_{PV3}$, $\mu_{PV4}$, $\mu_{PV5}$, $\mu_{PV6}$, and $\mu_{PV7}$ respectively indicating average voltages of eight threshold voltage distributions HIS_DIS are stored in the history voltage storage unit 230.

In order to perform an LSB read operation on the eight threshold voltage distributions HIS_DIS, the read voltage setting unit 220 may provide two LSB read voltages HIS_LSB1 and HIS_LSB2 to the read operation control unit 210, thereby performing two LSB read operations.

The two LSB read operations using the two LSB read voltages HIS_LSB1 and HIS_LSB2 and performed in the read operation control unit 210 may fail.

When the two LSB read operations have failed, the read voltage setting unit 220 may assume that levels of two LSB average voltages $\mu_{PV3}$ and $\mu_{PV7}$ respectively adjacent to the two LSB read voltages HIS_LSB1 and HIS_LSB2, among the eight history average voltages $\mu_{ERASE}$, $\mu_{PV1}$, $\mu_{PV2}$, $\mu_{PV3}$, $\mu_{PV4}$, $\mu_{PV5}$, $\mu_{PV6}$, and $\mu_{PV7}$ Stored in the history voltage storage unit 230, have been changed (HIS_DIS->CRT_DIS).

Accordingly, the read voltage setting unit 220 may select one LSB auxiliary read voltage ASSL based on the two LSB read voltages HIS_LSB1 and HIS_LSB2 and provide the selected LSB auxiliary read voltage ASSL to the read operation control unit 210, thereby performing one LSB auxiliary read operation.

In addition, the read voltage setting unit 220 may predict two LSB second cell counts SECOND_CNTL<1:2> through the first arithmetic operation performed based on the two LSB read voltages HIS_LSB1 and HIS_LSB2 and the two LSB average voltages $\mu_{PV3}$ and $\mu_{PV7}$.

In addition, the read voltage setting unit 220 may measure two LSB first cell counts FIRST_CNTL<1:2> through the third arithmetic operation that is performed on the two LSB third cell counts SEL_CNTL<1:2> and the one LSB fourth cell count ASS_CNTL. The two LSB third cell counts SEL_CNTL<1:2> are obtained as the results of the two LSB read operations that have failed at least once. The one LSB fourth cell count ASS_CNTL is obtained as the result of the one LSB auxiliary read operation.

In addition, the read voltage setting unit 220 may determine the adjustments made to the two average voltages $\mu_{PV3}$ and $\mu_{PV7}$, resulting in $\mu_{PV3}'$ and $\mu_{PV7}'$, through the second arithmetic operation performed based on the difference between the two LSB first cell counts FIRST_CNTL<1:2> and the two LSB second cell counts SECOND_CNTL<1:2>.

In addition, the read voltage setting unit 220 may update (UPDATE_DIS) the two average voltages $\mu_{PV3}$ and $\mu_{PV7}$ with the adjusted average voltage $\mu_{PV3}'$ and $\mu_{PV7}'$ and store the updated voltages in the history voltage storage unit 230.

In order to perform the LSB read operation, the read voltage setting unit 220 may determine two adjusted LSB read voltages UPDATE_LSB1 and UPDATE_LSB2 by adding the values of the adjusted average voltages $\mu_{PV3}'$ and $\mu_{PV7}'$ and the values of the average voltages $\mu_{PV2}$ and $\mu_{PV6}$ respectively adjacent to the adjusted average voltages $\mu_{PV3}'$ and $\mu_{PV7}'$, and then halving the addition results.

Subsequently, the read voltage setting unit 220 may provide the two adjusted LSB read voltages UPDATE_LSB1 and UPDATE_LSB2 to the read operation control unit 210, and perform the two LSB read operations again.

Figure 9:
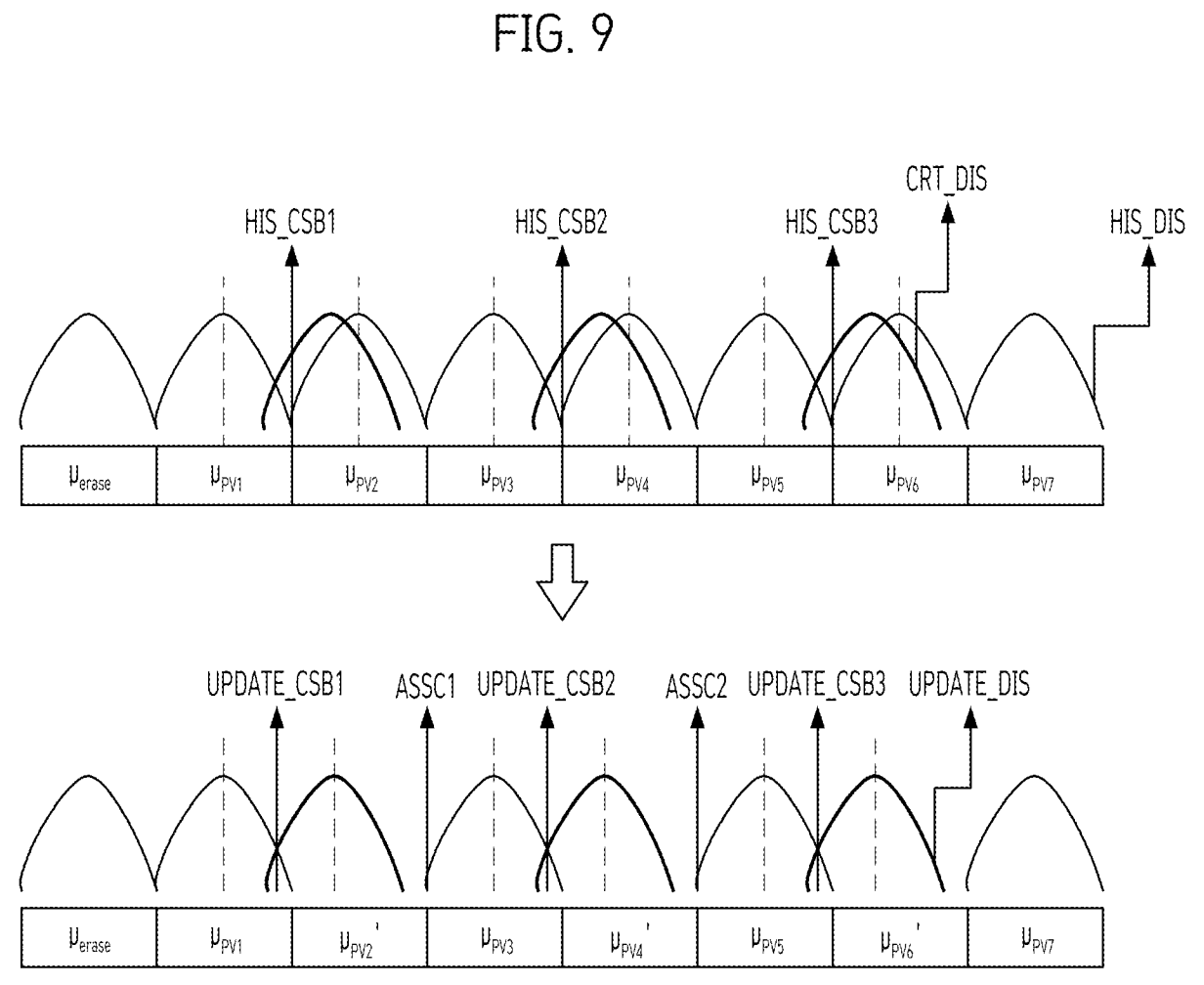

FIGS. 8 and 9 describe an auxiliary read operation performed by the memory controller in accordance with an embodiment of the present disclosure. The auxiliary read operation may be performed when a central significant bit (CSB) read operation fails in the data read pattern described with reference to FIG. 5.

Referring to FIGS. 1 to 4 together with FIGS. 5 and 8, when the plurality of memory cells included in the memory device 150 are triple level cells (TLCs) that each store three-bit data, and a read operation for reading CSB data among data stored in a selected memory cell fails, a subsequent operation performed by the read voltage setting unit 220 may be determined.

First, as described with reference to FIG. 5, a CSB read operation for a selected memory cell in a TLC state may include three CSB read operations using three CSB read voltages CSB1, CSB2, and CSB3, respectively.

When the three CSB read operations using the three CSB read voltages CSB1, CSB2, and CSB3 fail, the read voltage setting unit 220 may confirm three third cell counts SEL_CNTC<1:3> representing the number of cells measured to have a specific value based on the three CSB read voltages CSB1, CSB2, and CSB3, respectively.

In such a case, the first third-cell count SEL_CNTC1 measured based on the first CSB read voltage CSB1 may represent the number of memory cells having CSB logic values of '1.' However, the second third-cell count SEL_CNTC2 measured based on the second CSB read voltage CSB2 and the third third-cell count SEL_CNTC3 measured based on the third CSB read voltage CSB3 may not be considered to mean specific CSB logic values because the number of memory cells having CSB logic values of '1' and the number of memory cells having CSB logic values of '0' are mixed in each of the second third-cell count SEL_CNTC2 and the third third-cell count SEL_CNTC3.

Accordingly, the read voltage setting unit 220 may determine levels of two CSB auxiliary read voltages ASSC<1:2> based on the three CSB read voltages CSB1, CSB2, and CSB3. For example, the read voltage setting unit 220 may determine a voltage corresponding to the mean of the CSB read voltages CSB1 and CSB2 and a voltage corresponding to the mean of the CSB read voltages CSB2 and CSB3 as the two CSB auxiliary read voltages ASSC<1:2>, respectively, as illustrated in FIG. 8.

Subsequently, the read voltage setting unit 220 may provide the two CSB auxiliary read voltages ASSC<1:2> to the read operation control unit 210 so that two auxiliary read operations are performed in the memory device 150.

The read voltage setting unit 220 may measure two CSB fourth cell counts ASS_CNTC<1:2> through the two auxiliary read operations performed based on the two CSB auxiliary read voltages ASSC<1:2>.

In addition, the read voltage setting unit 220 may perform a third arithmetic operation on the three CSB third cell counts SEL_CNTC<1:3> and the two CSB fourth cell counts ASS_CNTC<1:2> to determine three CSB first cell counts FIRST_CNTC<1:3>.

That is, the read voltage setting unit 220 may perform the third arithmetic operation on the three CSB third cell counts SEL_CNTC<1:3>, representing the number of cells measured to have specific values based on the three CSB read voltages CSB1, CSB2, and CSB3, and the two CSB fourth cell counts ASS_CNTC<1:2> measured based on the two CSB auxiliary read voltages ASSC<1:2>. As a result, memory cells having CSB logic values of '1' are distinguished by '111,' '101,' and '100,' and memory cells having CSB logic values of '0' are distinguished by '011,' '001,' and '000,' based on the three CSB third cell counts SEL_CNTC<1:3>.

Accordingly, the read voltage setting unit 220 may measure the number of memory cells having CSB logic values of '111' as the first CSB first cell count FIRST_CNTC1. In addition, the read voltage setting unit 220 may measure the number of memory cells having CSB logic values of '111,' '011,' and '001' as the second CSB first cell count FIRST_CNTC2. In addition, the read voltage setting unit 220 may measure the number of memory cells having CSB logic values of '111,' '011,' '001,' '101,' and '100' as the third CSB first cell count FIRST_CNTC3.

In this way, it may be seen that the third arithmetic operation performed by the read voltage setting unit 220 is an arithmetic operation for accurately measuring a logical value by combining the logical value signified by the three CSB third cell counts SEL_CNTC<1:3> and the logical value signified by the two CSB fourth cell counts ASS_CNTC<1:2> when the logic value cannot be accurately distinguished using only the three CSB third cell counts SEL_CNTC<1:3>. As the result of the third arithmetic operation, the three CSB first cell counts FIRST_CNTLC<1:3>, whose logic values are accurately distinguished, may be obtained.

Referring to FIG. 9, it may be seen that when the plurality of memory cells included in the memory device 150 are triple level cells (TLC) that each store three-bit data, eight history average voltages $\mu_{ERASE}$, $\mu_{PV1}$, $\mu_{PV2}$, $\mu_{PV3}$, $\mu_{PV4}$, $\mu_{PV5}$, $\mu_{PV6}$, and $\mu_{PV7}$ representing respective average voltages of eight threshold voltage distributions HIS_DIS are stored in the history voltage storage unit 230.

In order to perform a CSB read operation on the eight threshold voltage distributions HIS_DIS, the read voltage setting unit 220 may provide three CSB read voltages HIS_CSB1, HIS_CSB2, and HIS_CSB3 to the read operation control unit 210, thereby performing three CSB read operations.

The three CSB read operations using the three CSB read voltages HIS_CSB1, HIS_CSB2, and HIS_CSB3 and performed in the read operation control unit 210 may fail.

When the three CSB read operations have failed, the read voltage setting unit 220 may assume that levels of three CSB average voltages μPV2, $\mu_{PV4}$, and $\mu_{PV6}$ respectively adjacent to the three CSB read voltages HIS_CSB1, HIS_CSB2, and HIS_CSB3, among the eight history average voltages $\mu_{ERASE}$, $\mu_{PV1}$, $\mu_{PV2}$, $\mu_{PV3}$, μPV4, $\mu_{PV5}$, $\mu_{PV6}$, and $\mu_{PV7}$ stored in the history voltage storage unit 230, have been changed (HIS_DIS->CRT_DIS).

Accordingly, the read voltage setting unit 220 may select two CSB auxiliary read voltages ASSC<1:2> based on the three CSB read voltages HIS_CSB1, HIS_CSB2, and HIS_CSB3 and provide the selected CSB auxiliary read voltages ASSC<1:2> to the read operation control unit 210, thereby performing two CSB auxiliary read operations.

In addition, the read voltage setting unit 220 may predict three CSB second cell counts SECOND_CNTC<1:3> through the first arithmetic operation performed based on the three CSB read voltages HIS_CSB1, HIS_CSB2, and HIS_CSB3 and the three CSB average voltages $\mu_{PV2}$, $\mu_{PV4}$, and $\mu_{PV6}$.

In addition, the read voltage setting unit 220 may measure three CSB first cell counts FIRST_CNTC<1:3> through the third arithmetic operation that is performed on the three CSB third cell counts SEL_CNTC<1:3> and the two CSB fourth cell counts ASS_CNTC<1:2>. The three CSB third cell counts SEL_CNTC<1:3> are obtained as the result of the three CSB read operations that have failed at least once. The two CSB fourth cell counts ASS_CNTC<1:2> are obtained as the result of the two CSB auxiliary read operations.

In addition, the read voltage setting unit 220 may determine the adjustments made to the three average voltages $\mu_{PV2}$, $\mu_{PV4}$, and $\mu_{PV6}$, resulting in $\mu_{PV2}'$, $\mu_{PV4}'$, and $\mu_{PV6}'$ through the second arithmetic operation performed based on the difference between the three CSB first cell counts FIRST_CNTC<1:3> and the three CSB second cell counts SECOND_CNTC<1:3>.

In addition, the read voltage setting unit 220 may update (UPDATE_DIS) the three average voltages $\mu_{PV2}$, $\mu_{PV4}$, and $\mu_{PV6}$ with the adjusted average voltages $\mu_{PV2}'$, $\mu_{PV4}'$, and $\mu_{PV6}'$ and store the updated voltages in the history voltage storage unit 230.

In order to perform the CSB read operation, the read voltage setting unit 220 may determine three adjusted CSB read voltages UPDATE_CSB1, UPDATE_CSB2, and UPDATE_CSB3 by adding the values of the adjusted average voltages $\mu_{PV2}'$, $\mu_{PV4}'$, and $\mu_{PV6}'$ and the values of the average voltages $\mu_{PV1}$, $\mu_{PV3}$, and $\mu_{PV5}$ respectively adjacent to the adjusted average voltages $\mu_{PV2}'$, $\mu_{PV4}'$, and $\mu_{PV6}'$ and then halving the addition results.

Subsequently, the read voltage setting unit 220 may provide the three adjusted CSB read voltages UPDATE_CSB1, UPDATE_CSB2, and UPDATE_CSB3 to the read operation control unit 210, and perform the three CSB read operations again.

Figure 11:
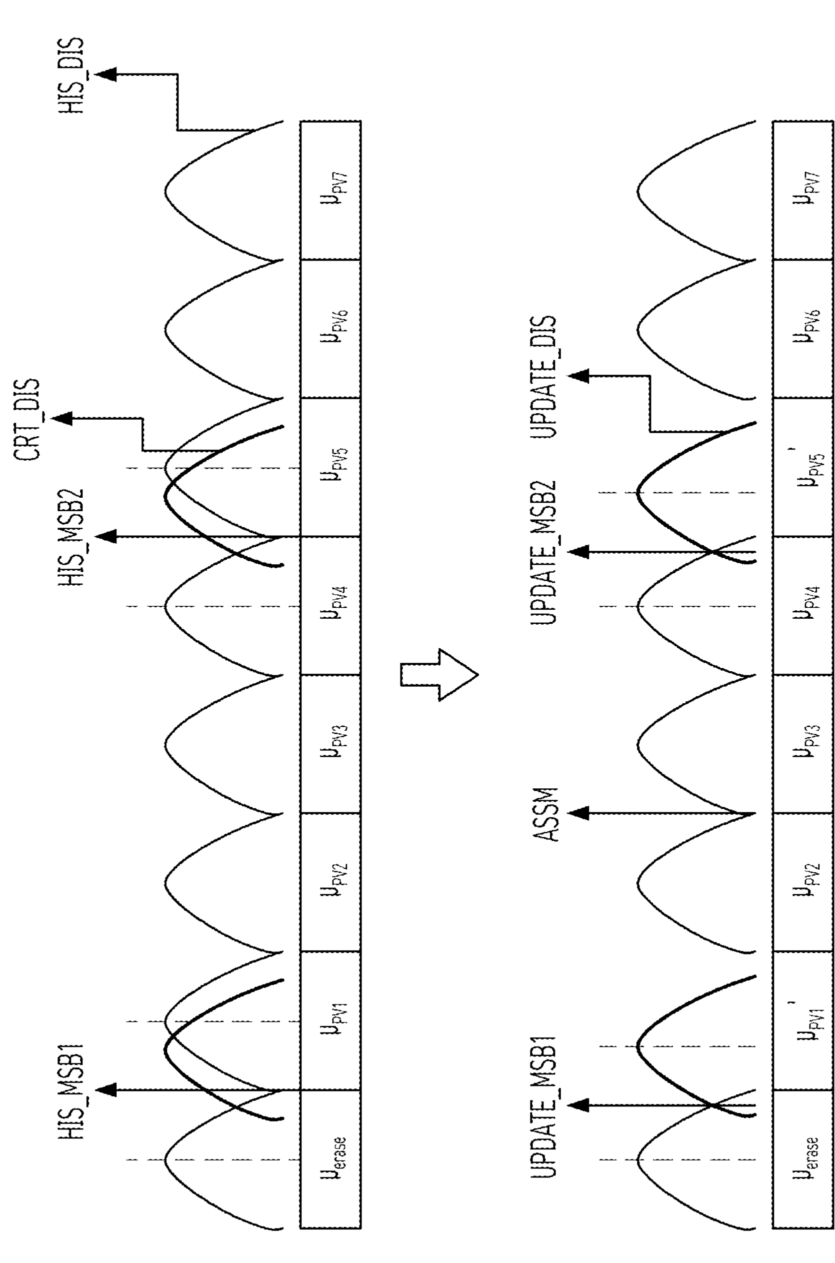

FIGS. 10 and 11 describe an auxiliary read operation performed by the memory controller in accordance with an embodiment of the present disclosure. The auxiliary read operation may be performed when a most significant bit (MSB) read operation fails in the data read pattern described with reference to FIG. 5.

Referring to FIGS. 1 to 4 together with FIGS. 5 and 10, when the plurality of memory cells included in the memory device 150 are triple level cells (TLCs) that each store three-bit data, and a read operation for reading MSB data among data stored in a selected memory cell fails, a subsequent operation to be performed by the read voltage setting unit 220 may be determined.

First, as described with reference to FIG. 5, an MSB read operation for a selected memory cell in a TLC state may include two MSB read operations respectively using two MSB read voltages MSB1 and MSB2.

When the two MSB read operations using the two MSB read voltages MSB1 and MSB2 fail, the read voltage setting unit 220 may determine two third cell counts SEL_CNTM<1:2> representing the number of cells measured to have specific values based on the two MSB read voltages MSB1 and MSB2, respectively.

In such a case, the first third-cell count SEL_CNTM1 measured based on the first MSB read voltage MSB1 may represent the number of memory cells having MSB logic values of '1.' However, the second third-cell count SEL_CNTM2 measured based on the second MSB read voltage MSB2 may not be considered to mean a specific MSB logic value because the number of memory cells having MSB logic values of '1' and the number of memory cells having MSB logic values of '0' are mixed in the second third-cell count SEL_CNTM2.

Accordingly, the read voltage setting unit 220 may determine a level of an MSB auxiliary read voltage ASSM based on the two MSB read voltages MSB1 and MSB2. For example, the read voltage setting unit 220 may determine a voltage corresponding to the mean of the two MSB read voltages MSB1 and MSB2 as the MSB auxiliary read voltage ASSM, as illustrated in FIG. 10.

Subsequently, the read voltage setting unit 220 may provide the MSB auxiliary read voltage ASSM to the read operation control unit 210 so that one auxiliary read operation is performed in the memory device 150.

The read voltage setting unit 220 may measure one MSB fourth cell count ASS_CNTM through the one auxiliary read operation performed based on the MSB auxiliary read voltage ASSM.

In addition, the read voltage setting unit 220 may perform a third arithmetic operation on two MSB third cell counts SEL_CNTM<1:2> and one MSB fourth cell count ASS_CNTM and determine two MSB first cell counts FIRST_CNTM<1:2>.

That is, the read voltage setting unit 220 may perform the third arithmetic operation on the two MSB third cell counts SEL_CNTM<1:2>, each representing the number of cells measured to have a specific value based on each of the two MSB read voltages MSB1 and MSB2, and the one MSB fourth cell count ASS_CNTM measured based on the MSB auxiliary read voltage ASSM. As a result, memory cells having MSB logic values of '1' are distinguished by '11' and '10,' and memory cells having MSB logic values of '0' are distinguished by '01' and '00,' based on the two MSB third cell counts SEL_CNTM<1:2>.

Accordingly, the read voltage setting unit 220 may measure the number of memory cells having MSB logic values of '11' as the first MSB first cell count FIRST_CNTM1. In addition, the read voltage setting unit 220 may measure the number of memory cells having MSB logic values of '11,' '01,' and '00' as the second MSB first cell count FIRST_CNTM2.

In this way, it may be seen that the third arithmetic operation performed by the read voltage setting unit 220 is an arithmetic operation for accurately measuring a logic value by combining the logic value signified by the two MSB third cell counts SEL_CNTM<1:2> and the logic value signified by one MSB fourth cell count ASS_CNTM when the logic value may not be accurately distinguished using only the two MSB third cell counts SEL_CNTM<1:2>. As the result of the third arithmetic operation, the two MSB first cell counts FIRST_CNTM<1:2>, whose logic values are accurately distinguished, may be obtained.

Referring to FIG. 11, it may be seen that, when the plurality of memory cells included in the memory device 150 are triple level cells (TLCs) that each store three-bit data, eight history average voltages $\mu_{ERASE}$, $\mu_{PV1}$, $\mu_{PV2}$, $\mu_{PV3}$, $\mu_{PV4}$, $\mu_{PV5}$, $\mu_{PV6}$, and $\mu_{PV7}$ respectively indicating average voltages of eight threshold voltage distributions HIS_DIS are stored in the history voltage storage unit 230.

In order to perform an MSB read operation on the eight threshold voltage distributions HIS_DIS, the read voltage setting unit 220 may provide two MSB read voltages HIS_MSB1 and HIS_MSB2 to the read operation control unit 210, thereby performing two MSB read operations.

The two MSB read operations using the two MSB read voltages HIS_MSB1 and HIS_MSB2 performed in the read operation control unit 210 may fail.

When the two MSB read operations have failed, the read voltage setting unit 220 may assume that levels of two MSB average voltages $\mu_{PV1}$ and $\mu_{PV5}$ respectively adjacent to the two MSB read voltages HIS_MSB1 and HIS_MSB2, among the eight history average voltages $\mu_{ERASE}$, $\mu_{PV1}$, $\mu_{PV2}$, $\mu_{PV3}$, $\mu_{PV4}$, $\mu_{PV5}$, $\mu_{PV6}$, and $\mu_{PV7}$ Stored in the history voltage storage unit 230, have been changed (HIS_DIS->CRT_DIS).

Accordingly, the read voltage setting unit 220 may select one MSB auxiliary read voltage ASSM based on the two MSB read voltages HIS_MSB1 and HIS_MSB2 and provide the selected MSB auxiliary read voltage ASSM to the read operation control unit 210, thereby performing one MSB auxiliary read operation.

In addition, the read voltage setting unit 220 may predict two MSB second cell counts SECOND_CNTM<1:2> through the first arithmetic operation performed based on the two MSB read voltages HIS_MSB1 and HIS_MSB2 and the two MSB average voltages $\mu_{PV1}$ and $\mu_{PV5}$.

In addition, the read voltage setting unit 220 may measure two MSB first cell counts FIRST_CNTM<1:2> through the third arithmetic operation that is performed on the two MSB third cell counts SEL_CNTM<1:2> and the one MSB fourth cell count ASS_CNTM. The two MSB third cell counts SEL_CNTM<1:2> are obtained as the result of the two MSB read operations that have failed at least once. The one MSB fourth cell count ASS_CNTM is obtained as the result of the one MSB auxiliary read operation.

In addition, the read voltage setting unit 220 may determine the adjustments made to the two average voltages $\mu_{PV1}$ and $\mu_{PV5}$, resulting in $\mu_{PV1}'$ and $\mu_{PV5}'$, through the second arithmetic operation performed based on the difference between the two MSB first cell counts FIRST_CNTM<1:2> and the two MSB second cell counts SECOND_CNTM<1:2>.

In addition, the read voltage setting unit 220 may update (UPDATE_DIS) the two average voltages $\mu_{PV1}$ and $\mu_{PV5}$ with the adjusted average voltage $\mu_{PV1}'$ and $\mu_{PV5}'$ and store the updated voltages in the history voltage storage unit 230.

In order to perform the MSB read operation, the read voltage setting unit 220 may determine two adjusted MSB read voltages UPDATE_MSB1 and UPDATE_MSB2 by adding the values of the adjusted average voltages $\mu_{PV1}'$ and $\mu_{PV5}'$ and the values of the average voltages $\mu_{ERASE}$ and $\mu_{PV4}$ respectively adjacent to the adjusted average voltages $\mu_{PV1}'$ and $\mu_{PV5}'$ and then halving the addition results.

Subsequently, the read voltage setting unit 220 may provide the two adjusted MSB read voltages UPDATE_MSB1 and UPDATE_MSB2 to the read operation control unit 210, and perform the two MSB read operations again.

Figure 12:
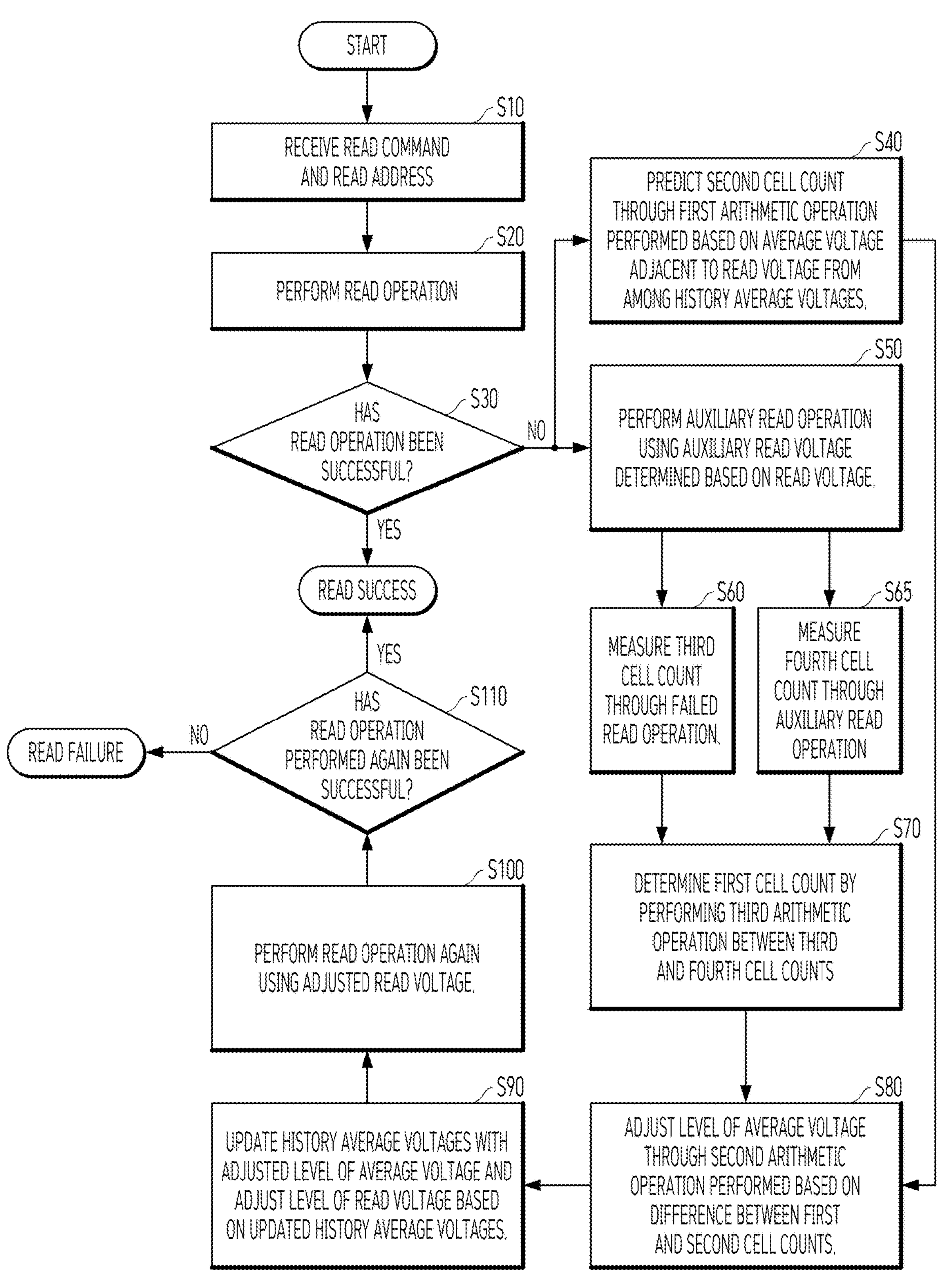
FIG. 12 is a flowchart describing a read operation performed by the memory controller in accordance with an embodiment of the present disclosure.

FIG. 12 is a flowchart describing a read operation performed by the memory controller in accordance with an embodiment of the present disclosure.

Referring to FIG. 12, the read operation may commence when the memory controller 130 receives a read command and a read address (S10).

The memory controller 130 may perform a read operation based on the read command and the read address (S20). For example, the memory controller 130 may perform the read operation, using an LSB read voltage for performing an LSB read operation indicated by the read command, on a plurality of memory cells included in a word line indicated by the read address.

The memory controller 130 may determine whether the read operation performed in S20 has been successful (S30). For example, the memory controller 130 may perform error correction decoding on read data acquired from a selected memory cell by performing the read operation, and determine whether the read operation has been successful based on the result of performing the error correction decoding.

If it is determined in S30 that the read operation has been successful (YES in S30), the memory controller 130 may conclude the read operation as successful and terminate the operation.

On the other hand, if it is determined in S30 that the select read operation has failed (NO in S30), the memory controller 130 may determine a first cell count based on the failed read operation (S50, S60, S65, and S70).

Separately from the operation for determining the first cell count (S50, S60, S65, and S70), the memory controller 130 may predict a second cell count through a first arithmetic operation performed based on an average voltage adjacent to a read voltage used for the read operation, the average voltage being selected from among the plurality of history average voltages stored in the history voltage storage unit 230 (S40).

Specifically, the operation for determining the first cell count (S50, S60, S65, and S70) may be performed in the following order.

First, the memory controller 130 may perform an auxiliary read operation using an auxiliary read voltage determined based on the read voltage (S50).

Following S50, the memory controller 130 may measure a third cell count through the failed read operation (S60).

Following S50, the memory controller 130 may measure a fourth cell count through the auxiliary read operation (S65).

The memory controller 130 may determine the first cell count by performing a third arithmetic operation between the third cell count measured in S60 and the fourth cell count measured in S65 (S70).

The memory controller 130 may adjust the level of the average voltage through a second arithmetic operation performed based on the difference between the second cell count predicted in S40 and the first cell count determined through S50, S60, S65, and S70 (S80).

The memory controller 130 may update the plurality of history average voltages stored in the history voltage storage unit 230 with the adjusted level of the average voltage and adjust the level of the read voltage based on the updated history average voltages (S90).

After adjusting the read voltage based on the updated history average voltages in S90, the memory controller 130 may perform the read operation again using the adjusted read voltage (S100).

The memory controller 130 may confirm whether the read operation performed again in S100 has been successful (S110). For example, the memory controller 130 may perform error correction decoding on read data acquired from a selected memory cell according to the read operation performed again, and determine whether the read operation has failed based on the result of performing the error correction decoding.

If it is determined in S110 that the read operation performed again has been successful (YES in S110), the memory controller 130 may conclude the read operation as successful and terminate the operation.

On the other hand, if it is determined in S110 that the read operation performed again has failed (NO in S110), the memory controller 130 may conclude the read operation as failed and terminate the operation.

Figure 13:
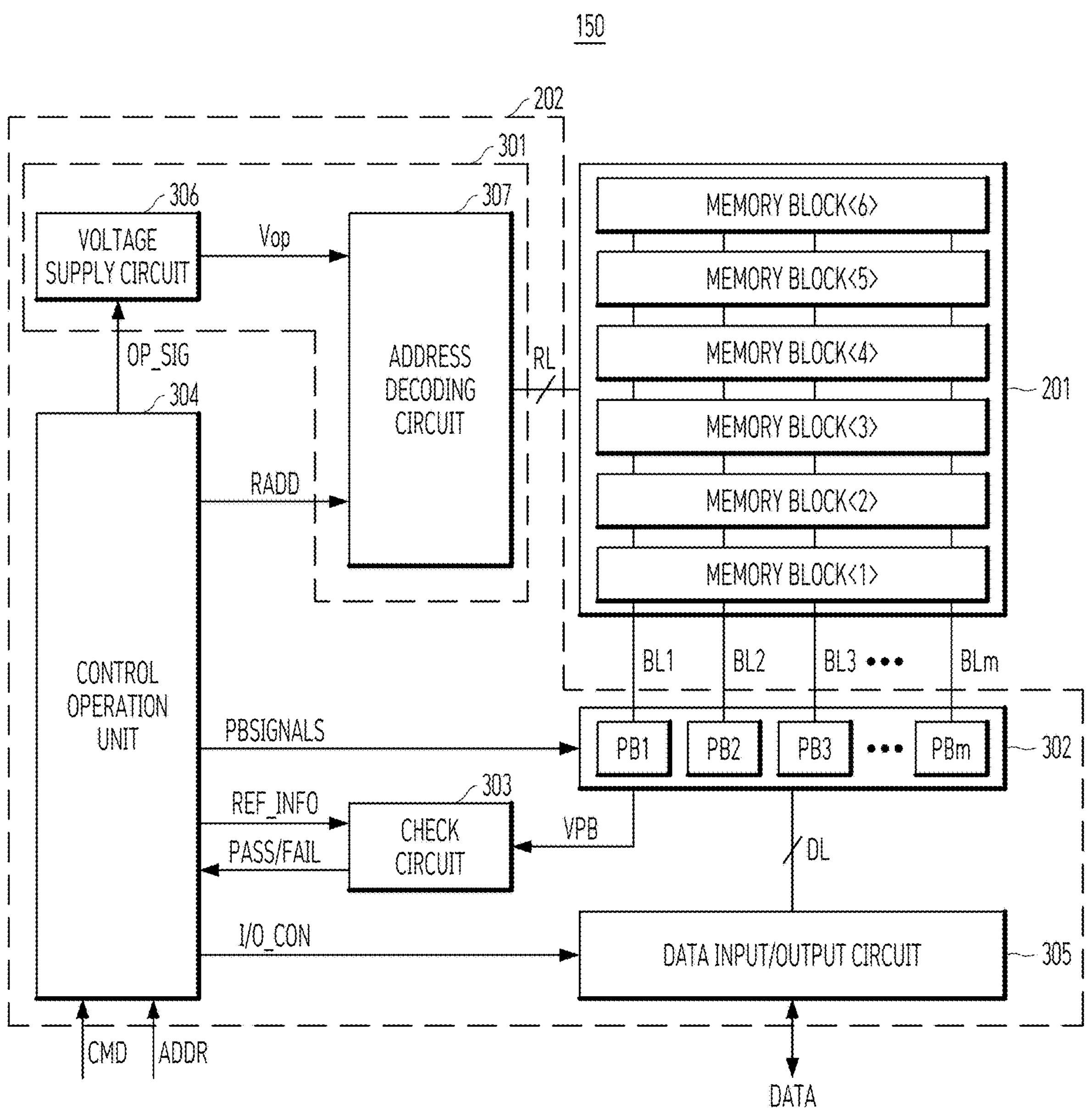
FIG. 13 illustrates a memory device in accordance with an embodiment of the present disclosure.

FIG. 13 illustrates a memory device in accordance with an embodiment of the present disclosure. The memory device shown in FIG. 13 may correspond to the memory device 150 shown in FIGS. 1 and 2.

Referring to FIG. 13, the memory device 150 may include a memory cell array 201 and a controller 202. The controller 202 may include a control circuit unit 301 and a control operation unit 304. The control circuit unit 301 may include a voltage supply circuit 306 and an address decoding circuit 307. The controller 202 may further include a page buffer circuit 302, a check circuit 303, and a data input/output circuit 305.

The memory cell array 201 may include a plurality of memory blocks MEMORY BLOCK<1:6>. The plurality of memory blocks MEMORY BLOCK<1:6> may be connected to the address decoding circuit 307 through row lines RL. The plurality of memory blocks MEMORY BLOCK<1:6> may be connected to the page buffer circuit 302 through bit lines BL1 to BLm, m being a positive integer. Each of the memory blocks MEMORY BLOCK<1:6> may include a plurality of memory cells.

In an embodiment, the plurality of memory cells may be nonvolatile memory cells. Memory cells coupled to the same word line among the plurality of memory cells may be defined as one physical page. That is, the memory cell array 201 may be configured with a plurality of physical pages. In accordance with an embodiment of the present disclosure, each of the plurality of memory blocks BLK1 to BLKz included in the memory cell array 201 may further include a plurality of dummy cells. One or more dummy cells may be coupled in series between a drain select transistor and memory cells and between a source select transistor and the memory cells.

The address decoding circuit 307 may be connected to the memory cell array 201 through the row lines RL. The row lines RL may include the drain selection line, word lines, the source selection line, and a common source line.

The address decoding circuit 307 may be configured to operate under the control of the control operation unit 304. The address decoding circuit 307 may receive an address RADD from the control operation unit 304.

The address decoding circuit 307 may be configured to decode a block address of the received address RADD. The address decoding circuit 307 may select at least one memory block from among the memory blocks MEMORY BLOCK<1:6> based on the decoded block address. The address decoding circuit 307 may be configured to decode a row address of the received address RADD. The address decoding circuit 307 may select at least one word line from among word lines of the selected memory block based on the decoded row address. The address decoding circuit 307 may apply operating voltages Vop, which are supplied from the voltage supply circuit 306, to the selected word line.

In a program operation, the address decoding circuit 307 may apply a program voltage to the selected word line, and apply a pass voltage having a level lower than that of the program voltage to unselected word lines. In a program verify operation, the address decoding circuit 307 may apply a verify voltage to the selected word line, and apply a verify pass voltage having a level higher than that of the verify voltage to the unselected word lines.

In a read operation, the address decoding circuit 307 may apply a read voltage to the selected word line, and apply a read pass voltage having a level higher than that of the read voltage to the unselected word lines.

In accordance with an embodiment of the present disclosure, an erase operation of the memory device 150 is performed in units of memory blocks. In the erase operation, the address ADDR input to the memory device 150 includes a block address. The address decoding circuit 307 may decode the block address and select one memory block based on the decoded block address. In the erase operation, the address decoding circuit 307 may apply a ground voltage to word lines coupled to the selected memory block.

In accordance with an embodiment of the present disclosure, the address decoding circuit 307 may decode a column address in the address ADDR transmitted thereto. The decoded column address may be transmitted to the page buffer circuit 302. For example, the address decoding circuit 307 may include components such as a row decoder, a column decoder, and an address buffer.

The voltage supply circuit 306 may be configured to generate a plurality of operating voltages Vop using an external power supply voltage. The voltage supply circuit 306 may operate under the control of the control operation unit 304.

In an embodiment, the voltage supply circuit 306 may regulate the external power supply voltage, and generate an internal power supply voltage.

In an embodiment, the voltage supply circuit 306 may generate the plurality of operating voltages Vop using the external power supply voltage or the internal power supply voltage. For example, the voltage supply circuit 306 may generate a plurality of erase voltages, a plurality of program voltages, a plurality of pass voltages, a plurality of selective read voltages and a plurality of unselective read voltages.

The voltage supply circuit 306 may include a plurality of pumping capacitors, which receive the internal power supply voltage, to generate the plurality of operating voltages Vop having various voltage levels, and generate the plurality of operating voltages Vop by selectively activating the plurality of pumping capacitors under the control of the control operation unit 304.

The generated operating voltages Vop may be supplied to the memory cell array 201 by the address decoding circuit 307.

The page buffer circuit 302 may include a plurality of page buffers PB1 to PBm. The plurality of page buffers PB1 to PBm may be connected to the memory cell array 201 through the plurality of bit lines BL1 to BLm, respectively. The plurality of page buffers PB1 to PBm may operate under the control of the control operation unit 304.

The plurality of page buffers PB1 to PBm may communicate data DATA with the data input/output circuit 305. During the program operation, the plurality of page buffers PB1 to PBm may receive data DATA to be stored in the memory cell array 201, through the data input/output circuit 305 and data lines DL.

In the program operation, the plurality of page buffers PB1 to PBm may transfer, to selected memory cells through the bit lines BL1 to BLm, the data DATA received through the data input/output circuit 305 when a program pulse is applied to a selected word line connected to the selected memory cells. The selected memory cells are programmed to store the transferred data DATA. A memory cell coupled to a bit line through which a program allow voltage (e.g., a ground voltage) is applied may have a threshold voltage that is increased. AA memory cell coupled to a bit line through which a program inhibit voltage (e.g., a power voltage) is applied may have a threshold voltage that remains without being increased. In a program verify operation, the plurality of page buffers PB1 to PBm temporality store data DATA received from the selected memory cells through the bit lines BL1 to BLm.

In a read operation, the page buffer circuit 302 may receive data DATA read from memory cells of a selected page through the bit lines BL, and store the read data DATA in the plurality of page buffers PB1 to PBm.

In an erase operation, the page buffer circuit 302 may float the bit lines BL. In an embodiment, the page buffer circuit 302 may include a column selection circuit.

The data input/output circuit 305 is coupled to the plurality of page buffers PB1 to PBm through the data lines DL. The data input/output circuit 305 operates under the control of the control operation unit 304.

The data input/output circuit 305 may include a plurality of input/output buffers (not shown) that receive input data DATA. In a program operation, the data input/output circuit 305 may receive data DATA to be stored in the memory cell array 201 from an external controller (not shown). In a read operation, the data input/output circuit 305 outputs, to the external controller, data transmitted from the plurality of page buffers PB1 to PBm included in the page buffer circuit 302.

In a read operation or a verify operation, the check circuit 303 may generate a reference current in response to an reference information signal REF_INFO generated by the control operation unit 304, and output a pass signal or fail signal PASS/FAIL to the control operation unit 304 by comparing a sensing voltage VPB received from the page buffer circuit 302 and a reference voltage generated by the reference current.

The control operation unit 304 may be coupled to the address decoding circuit 307, the voltage supply circuit 306, the page buffer circuit 302, the data input/output circuit 305, and the check circuit 303. The control operation unit 304 may control overall operations of the memory device 150. The control operation unit 304 may operate in response to a command CMD transferred from an external device.

The control operation unit 304 may control the control circuit unit 301, the page buffer circuit 302, the data input/output circuit 305, and the check circuit 303 by generating several signals in response to a command CMD and an address ADDR. For example, the control operation unit 304 may generate an operation signal OPSIG, a row address RADD, a read/write circuit control signal PBSIGNALS, and an reference information signal REF_INFO in response to the command CMD and the address ADDR. The control operation unit 304 may output the operation signal OPSIG to the voltage supply circuit 306, the row address RADD to the address decoding circuit 307, the read/write circuit control signal PBSIGNALS to the page buffer circuit 302, and the reference information signal REF_INFO to the check circuit 303. Also, the control operation unit 304 may determine whether the verify operation has succeeded or failed based on the pass or fail signal PASS/FAIL provided by the check circuit 303.

The present disclosure described above is not limited by the aforementioned embodiments and the accompanying drawings, and it will be obvious to those skilled in the art to which the present disclosure pertains that various replacements, modifications, and changes may be made without departing from the technical spirit of the present disclosure.

What is claimed is:

1. A memory controller for controlling a memory device comprising a plurality of memory cells, the memory controller comprising:

a history voltage storage unit configured to store information on a plurality of history average voltages, each representing an average voltage of each of a plurality of threshold voltage distributions for the plurality of memory cells;

a read operation control unit configured to control the memory device to perform a read operation on a memory cell selected from among the plurality of memory cells; and a read voltage setting unit configured to, when a read operation performed under the control of the read operation control unit using a read voltage fails, determine a first cell count representing a number of cells measured to have a specific value based on the read voltage, determine a second cell count representing a number of cells predicted to have the specific value based on the read voltage through a first arithmetic operation performed based on an average voltage that is adjacent to the read voltage and selected from among the plurality of history average voltages, adjust a level of the average voltage through a second arithmetic operation performed based on a difference between the first cell count and the second cell count, and adjust a level of the read voltage based on the adjusted level of the average voltage.

2. The memory controller of claim 1, wherein, when the read operation performed N times by the read operation control unit using N different read voltages fails, the read voltage setting unit requests the read operation control unit to perform N−1 auxiliary read operations using N−1 different auxiliary read voltages that are determined based on the N different read voltages, and determines N first cell counts by performing a third arithmetic operation between N third cell counts and N−1 fourth cell counts, where the N third cell counts are obtained from the N read operations, and the N−1 fourth cell counts are obtained from the N−1 auxiliary read operations, N being a natural number equal to or greater than 1.

3. The memory controller of claim 2, wherein the read voltage setting unit determines N second cell counts by performing the first arithmetic operation N times based on N average voltages, each of which is adjacent to a corresponding one of the N different read voltages and selected from among the plurality of history average voltages.

4. The memory controller of claim 3, wherein the read voltage setting unit adjusts levels of the N average voltages by performing the second arithmetic operation N times based on a difference between each of the N first cell counts and each of the N second cell counts, and then adjusts levels of the N different read voltages based on the adjusted levels of the N average voltages.

5. The memory controller of claim 2, wherein, when N is 1 and the read operation performed by the read operation control unit fails, the read voltage setting unit assigns a cell count measured in the failed read operation as the first cell count, without requesting the read operation control unit to perform an auxiliary read operation.

6. The memory controller of claim 1, wherein the history voltage storage unit updates the plurality of history average voltages with the adjusted level of the average voltage.

7. The memory controller of claim 1, wherein the read operation control unit performs the read operation again using the read voltage having the adjusted level.

8. The memory controller of claim 1, further comprising:

an error correction unit configured to perform error correction decoding on read data acquired from the memory device during the read operation performed by the read operation control unit and to generate read fail information that indicates success or failure of the read operation based on a result of the error correction decoding.

9. The memory controller of claim 1, wherein at the time of the most recent successful read operation, the history voltage storage unit stores average voltages of the plurality of threshold voltage distributions for the plurality of memory cells as the plurality of history average voltages.

10. The memory controller of claim 9, wherein the selected memory cell is different from a memory cell subjected to the more recent successful read operation among the plurality of memory cells.

11. An operating method of a memory controller for controlling a memory device comprising a plurality of memory cells, the operating method comprising:

a step of storing information on a plurality of history average voltages, each representing an average voltage of each of a plurality of threshold voltage distributions for the plurality of memory cells;

a read operation step of performing a read operation using a read voltage on a selected memory cell among the plurality of memory cells;

a first counting step of, when the read operation fails, determining a first cell count that represents a number of cells measured to have a specific value based on the read voltage;

a second counting step of, when the read operation fails, determining a second cell count that represents a number of cells predicted to have the specific value based on the read voltage through a first arithmetic operation performed based on an average voltage that is adjacent to the read voltage and selected from among the plurality of history average voltages; and a step of, following the first and second counting steps, adjusting a level of the average voltage by performing a second arithmetic operation based on a difference between the first and second cell counts, and then adjusting a level of the read voltage based on the adjusted level of the average voltage.

12. The operating method of claim 11, wherein, when the read operation is performed N times using N different read voltages in the read operation step, the first counting step comprises:

a determination step of, when the N read operations fail, determining N−1 different auxiliary read voltages based on the N different read voltages;

an execution step of performing N−1 auxiliary read operations using the N−1 different auxiliary read voltages; and an arithmetic operation step of determining N first cell counts by performing a third arithmetic operation between N third cell counts and N−1 fourth cell counts, where the N third cell counts are obtained from the N read operations, and the N−1 fourth cell counts are obtained from the N−1 auxiliary read operations, N being a natural number equal to or greater than 1.

13. The operating method of claim 12, wherein in the second counting step, N second cell counts are determined by performing the first arithmetic operation N times based on N average voltages, each of which is adjacent to a corresponding one of the N different read voltages and selected from among the plurality of history average voltages.

14. The operating method of claim 13, wherein the step of adjusting comprises:

adjusting levels of the N average voltages by performing the second arithmetic operation performed N times based on a difference between each of the N first cell counts and each of the N second cell counts; and adjusting respective levels of the N different read voltages based on the adjusted levels of the N average voltages.

15. The operating method of claim 12, wherein when N is 1, the first counting step further comprises:

when the read operation fails, assigning a cell count measured in the failed read operation as the first count, without performing the determination step, the execution step, and the arithmetic operation step.

16. The operating method of claim 11, further comprising:

updating the plurality of history average voltages with the adjusted level of the average voltage.

17. The operating method of claim 11, further comprising:

performing the read operation again using the read voltage having the adjusted level.

18. The operating method of claim 11, further comprising:

performing error correction decoding on read data acquired from the selected memory cell during the read operation performed through the read operation step, and generating read fail information indicating success or failure of the read operation based on a result of the error correction decoding.

19. The operating method of claim 11, wherein in the step of storing, at the time of the most recent successful read operation, average voltages of the plurality of threshold voltage distributions for the plurality of memory cells are stored as the plurality of history average voltages.

20. The operating method of claim 19, wherein the selected memory cell is different from a memory cell subjected to the more recent successful read operation among the plurality of memory cells.

* * * * *